United States Patent
Mitsunaga

(10) Patent No.: US 9,060,134 B2
(45) Date of Patent: Jun. 16, 2015

(54) IMAGING APPARATUS, IMAGE SENSOR, IMAGING CONTROL METHOD, AND PROGRAM

(75) Inventor: Tomoo Mitsunaga, Kanagawa (JP)

(73) Assignee: Sony Corporation, Tokyo (JP)

( * ) Notice: Subject to any disclaimer, the term of this patent is extended or adjusted under 35 U.S.C. 154(b) by 1 day.

(21) Appl. No.: 13/983,672

(22) PCT Filed: Jan. 26, 2012

(86) PCT No.: PCT/JP2012/051600
§ 371 (c)(1),
(2), (4) Date: Aug. 5, 2013

(87) PCT Pub. No.: WO2012/111401
PCT Pub. Date: Aug. 23, 2012

(65) Prior Publication Data
US 2013/0308044 A1    Nov. 21, 2013

(30) Foreign Application Priority Data

Feb. 18, 2011    (JP) ................................. 2011-033085

(51) Int. Cl.
*H04N 3/14* (2006.01)
*H04N 5/335* (2011.01)
*H04N 5/235* (2006.01)
*H04N 5/353* (2011.01)
*H04N 5/3745* (2011.01)

(52) U.S. Cl.
CPC ............ *H04N 5/235* (2013.01); *H04N 5/3532* (2013.01); *H04N 5/3535* (2013.01); *H04N 5/2351* (2013.01); *H04N 5/2353* (2013.01); *H04N 5/3745* (2013.01)

(58) Field of Classification Search
USPC ............. 348/221.1, 224.1, 227.1–229.1, 362; 396/213, 215
See application file for complete search history.

(56) References Cited

U.S. PATENT DOCUMENTS 6,480,226 B1 * 11/2002 Takahashi et al. ............ 348/296

FOREIGN PATENT DOCUMENTS

| JP | 07-298142 | 11/1995 |
|----|-----------|---------|
| JP | 2001-503935 | 3/2001 |
| JP | 2003-527775 | 9/2003 |
| JP | 2010-136205 | 6/2010 |

OTHER PUBLICATIONS

Hamamoto et al., Design and Implementation of Adaptive-integration-time Image Sensor. 2001; 55(2):271-8.

* cited by examiner

*Primary Examiner* — Yogesh Aggarwal
(74) *Attorney, Agent, or Firm* — Wolf, Greenfield & Sacks, P.C.

(57) ABSTRACT

There are provided an imaging apparatus and method which perform different exposure control in pixel group units. Brightness in the pixel group units obtained by dividing a plurality of pixels of an imaging area of the image sensor is evaluated, and pixel group unit exposure control values are calculated according to an evaluation result. The image sensor outputs a control signal matching the calculated pixel group unit exposure control value to each pixel group constituent pixel, and controls exposure in the pixel group units. For example, the exposure control signal including an identical pattern is sequentially output to a plurality of pixels in a pixel group in a time sequence, and exposure control which sets an identical exposure time for a plurality of pixels belonging to one pixel group is realized.

15 Claims, 18 Drawing Sheets

IMAGING APPARATUS, IMAGE SENSOR, IMAGING CONTROL METHOD, AND PROGRAM

TECHNICAL FIELD

The present invention relates to an imaging apparatus, an image sensor, an imaging control method and a program. More particularly, the present invention relates to the imaging apparatus, the image sensor, the image capturing method and the program which control exposure in area units.

BACKGROUND ART

As an image sensor of an imaging apparatus which acquires image data, an area image sensor device which is a photoelectric converting element which utilizes a semiconductor such as a CMOS (Complementary Metal Oxide Semiconductor) is widely utilized.

One of performance characteristics of the image sensor is a dynamic range. The dynamic range refers to a range of brightness of incident light which can be converted as an effective image signal. A large dynamic range means that both dark light and bright light can be converted into image signals, and means that an image sensor has good performance. Although multiple devices to expand a dynamic range of an image sensor have been proposed, among these devices, there is a method of performing exposure control which is different per pixel.

A photodiode (PD) is provided to each pixel of a normal image sensor, and light incident on the photodiode associated with each pixel is photoelectrically converted into a charge. The PD of each pixel has a fixed charge amount which can be accumulated and therefore causes an overflow of a charge when receiving strong incident light and is placed in a saturated state in which no more signals can be accumulated, and, as a result, a signal equal to or more than a saturation level cannot be extracted. Further, noise generated by pixels and a reading circuit cancels a charge produced by too weak incident light, and therefore signals cannot be extracted.

To obtain an effective image signal, it is necessary to adjust exposure such that light of an adequate intensity is incident on each pixel of an image sensor. By making a mechanism of adjusting this exposure per pixel according to a light intensity per scene, it is possible to expand a dynamic range of an image sensor.

The technique based on this idea is, for example, a technique disclosed in Patent Document 1 (Japanese Translation of PCT Application Laid-Open No. 2003-527775). This technique employs a configuration of dividing an exposure period into a plurality of sub periods, and distributing a binary signal as to whether or not to integrate an exposure signal of each sub period, to each pixel through program (Prg) signal lines in a row direction and a column direction. According to this configuration, exposure is controlled per pixel.

Further, Non-Patent Document 1 (HAMAMOTO, Takayuki and AIZAWA, Kiyoharu, "Design and Implementation of Adaptive-integration-time Image Sensor", Journal of the Institute of Image Information and Television Engineers: Image Information Media, Vol. 55(2), page 271 to 278, February, 2001) discloses a configuration of controlling exposure per pixel by inspecting an accumulated charge which is being exposed per pixel assuming that each pixel is in a non-destroyed state and immediately resetting the charge of a pixel which is decided to be saturated.

Furthermore, Patent Document 2 (Japanese Patent Application Laid-Open No. 2010-136205) discloses a configuration of controlling exposure per pixel by means of a means which determines one of two types of a long exposure time or a short exposure time per pixel, based on an output of an image sensor and a pixel circuit which can control timings to reset and transfer a charge per pixel.

CITATION LIST

Patent Document

Patent Document 1: Japanese Translation of PCT Application Laid-Open No. 2003-527775
Patent Document 2: Japanese Patent Application Laid-Open No. 2010-136205

Non-Patent Document

Non-Patent Document 1: HAMAMOTO, Takayuki and AIZAWA, Kiyoharu, "Design and Implementation of Adaptive-integration-time Image Sensor", Journal of the Institute of Image Information and Television Engineers: Image Information Media, Vol. 55(2), page 271 to 278, February, 2001

SUMMARY OF THE INVENTION

Problems to be Solved by the Invention

The above conventional technique has a common problem of difficulty in wiring as described below. Information related to exposure control needs to be separately transmitted per pixel to perform exposure control which is different per pixel, and therefore the number of wirings to transmit signals increases. Although a conventional image sensor having a small number of pixels can employ such a configuration of adding wirings associated with pixels, a recent image sensor which has a remarkably increasing number of pixels currently has significant difficulty in employing this configuration.

For example, the technique disclosed in Patent Document 1 needs to add a plurality of special control signal lines which are not provided in a normal image sensor to control charge accumulation per pixel. Particularly, a configuration which uses program (Prg) signal lines in the row direction and the column direction is required to provide high speed signal transmission performance of transmitting a control signal in a next sub exposure period to all pixels in a very short time of one sub exposure period.

Further, although exposure can be principally controlled at multiple stages according to the technique of Patent Document 1, a configuration is required which generates in a sensor per frame a signal obtained by encoding for row direction and column direction program (Prg) signals in a time sequence bitmaps of the number of which is the same number of pixels of the sensor which encodes exposure control, or supply the same time sequence from an outside of the sensor per frame. Generating or supplying signals in a short time is almost impossible in a sensor which has a higher number of pixels.

Further, a technique disclosed in Non-Patent Document 1 discloses a configuration of reducing the number of wirings by performing saturation decision and reset control of each pixel in each column in parallel. However, when the number of pixels increases, even if a plurality of columns is controlled in parallel, it is expected that control cannot catch up.

Further, a configuration disclosed in Patent Document 2 has a lower degree of freedom than the technique of Patent Document 1, and so can realize exposure control per pixel by means of a simpler pixel control structure. Consequently, two stage (two stages of long/short time exposure) control of each pixel in an entire imaging area can be comparatively simply performed.

However, when the technique of Patent Document 2 also tries to perform control at multiple stages, similar to the technique of Patent Document 1, it is necessary to reset exposure time information of all pixels in the row and column directions and supply signals encoded in a transfer signal time sequence from a timing generator. Taking into account that this data amount is the total number of pixels×2 per frame and exposure control demands a greater necessity of parallelism than signal readout, it is very difficult to supply such a signal to a sensor.

As described above, a conventional technique of performing exposure control which is different per pixel to improve a dynamic range of an image sensor has difficulty in a wiring or a control configuration of reliably transmitting a control signal to each pixel, and therefore is not suitable to apply to a recent image sensor which has a higher number of pixels.

In light of such a situation, it is therefore an object of the present invention to provide an imaging apparatus, an image sensor, an imaging control method and a program which are also applicable to a recent image sensor having a greater number of pixels and which realize exposure control in area units.

Solutions to Problems

A first aspect of the present invention is an imaging apparatus which has: a brightness evaluating unit which evaluates brightness in a pixel group unit formed with a plurality of pixels; an exposure control value calculating unit which calculates an exposure control value in the pixel group unit according to an evaluation result of the brightness evaluating unit; and an image sensor which outputs a control signal matching the exposure control value in the pixel group unit calculated by the exposure control value calculating unit, to each pixel group constituent pixel, and controls exposure in the pixel group unit.

Further, according to one embodiment of the imaging apparatus of the present invention, the image sensor performs processing of sequentially outputting as the control signal the exposure control signal including an identical pattern to the plurality of pixels in the pixel group, and performs exposure control which sets an identical exposure time for the plurality of pixels belonging to one pixel group.

Further, according to one embodiment of the imaging apparatus of the present invention, the image sensor combines as the control signal a control signal in a row unit and a control signal in a column unit, and executes control processing of specifying a control target pixel.

Further, according to one embodiment of the imaging apparatus of the present invention, the image sensor sets in the pixel group unit an exposure start control signal which indicates a start timing of exposure processing and a read start control signal which indicates a start timing of read processing, and controls the exposure in the pixel group unit.

Further, according to one embodiment of the imaging apparatus of the present invention, the image sensor employs a hierarchical configuration of: a plurality of row line selectors which outputs exposure control signals for a pixel group set in a row direction; and a row group selector which outputs a control signal which designates a control signal output timing for the plurality of row line selectors.

Further, according to one embodiment of the imaging apparatus of the present invention, the row line selector outputs a control signal in a control target pixel group unit according to the control signal which designates the control signal output timing from the row group selector.

Further, according to one embodiment of the imaging apparatus of the present invention, the row line selector has: a shutter control signal generating unit which outputs an exposure pattern signal for executing exposure processing of each pixel; and a read control signal generating unit which outputs a read pattern signal for executing read processing of each pixel; and according to a type of the control signal which designates the control signal output timing from the row group selector, the row line selector executes processing of selectively outputting the control signal generated by the shutter control signal generating unit or the read control signal generating unit.

Further, according to one embodiment of the imaging apparatus of the present invention, the image sensor has: a column ADC which AD-converts pixel signals in a row of the image sensor in parallel; and a column selector which has a hierarchical structure of: a column group selector which generates a control signal in the pixel group unit; and a plurality of column line selectors which generates control signals in a pixel group in response to the control signal in the pixel group unit.

Further, according to one embodiment of the imaging apparatus of the present invention, the pixel group is a pixel group including a set of adjacent pixels.

Further, according to one embodiment of the imaging apparatus of the present invention, the pixel group is a pixel group including a set of pixels in a plurality of separate areas.

Further, a second aspect of the present invention is an image sensor which outputs a control signal matching an exposure control signal set in a pixel group unit obtained by dividing a plurality of pixels on an imaging area to each pixel group constituent pixel, and controls exposure in the pixel group unit.

Further, according to one embodiment of the image sensor of the present invention, the image sensor performs processing of sequentially outputting as the control signal the exposure control signal including an identical pattern to the plurality of pixels in the pixel group, and performs exposure control which sets an identical exposure time for the plurality of pixels belonging to one pixel group.

Further, according to one embodiment of the image sensor of the present invention, the image sensor combines as the control signal a control signal in a row unit and a control signal in a column unit, and executes control processing of specifying a control target pixel.

Further, according to one embodiment of the image sensor of the present invention, the image sensor sets in the pixel group unit an exposure start control signal which indicates a start timing of exposure processing and a read start control signal which indicates a start timing of read processing, and controls the exposure in the pixel group unit.

Further, a third aspect of the present invention is an imaging control method executed in an imaging apparatus includes: a brightness evaluating step of, at a brightness evaluating unit, evaluating brightness in a pixel group unit formed with a plurality of pixels; an exposure control value calculating step of, at an exposure control value calculating unit, calculating an exposure control value in the pixel group unit according to an evaluation result in the brightness evaluating step; and an image capturing step of, at an image sensor, outputting a control signal matching the exposure control value in the pixel group unit calculated in the exposure control value calculating step, to each pixel group constituent pixel, and controlling exposure in the pixel group unit.

Further, a fourth aspect of the present invention is a program which causes an imaging apparatus to execute image capturing control processing, and causes the imaging apparatus to execute: a brightness evaluating step of causing a brightness evaluating unit to evaluate brightness in a pixel group unit formed with a plurality of pixels; an exposure control value calculating step of causing an exposure control value calculating unit to calculate an exposure control value in the pixel group unit according to an evaluation result in the brightness evaluating step; and an image capturing step of causing an image sensor to output a control signal matching the exposure control value in the pixel group unit calculated in the exposure control value calculating step, to each pixel group constituent pixel, and control exposure in the pixel group unit.

In addition, the program according to the present invention is a program which can be provided in a computer-readable format to an image processing apparatus or a computer system which can execute various program codes by means of a memory medium or a communication medium. By providing such a program in a computer-readable format, processing matching the program is realized on the information processing apparatus or the computer system.

Other objects, characteristics and advantages of the present invention will be made obvious by detail description based on the embodiments and the accompanying drawings of the present invention described below. In addition, the system in this description is a logical set configuration of a plurality of apparatuses, and is not limited to a system in which the apparatuses of each configuration are provided in a single housing.

Effects of the Invention

According to a configuration of one embodiment of the present invention, a configuration is realized which executes different exposure control in pixel group units obtained by dividing a plurality of pixels of an imaging area of an image sensor.

Brightness evaluation is executed in pixel group units formed with a plurality of pixels, and a pixel group unit exposure control value is calculated according to an evaluation result. The image sensor outputs a control signal matching the calculated pixel group unit exposure control value to each pixel group constituent pixel, and controls exposure in the pixel group units. For example, the exposure control signal including an identical pattern is sequentially output to a plurality of pixels in a pixel group in a time sequence, and exposure control which sets an identical exposure time for a plurality of pixels belonging to one pixel group is realized.

MODE FOR CARRYING OUT THE INVENTION

Figure 1:
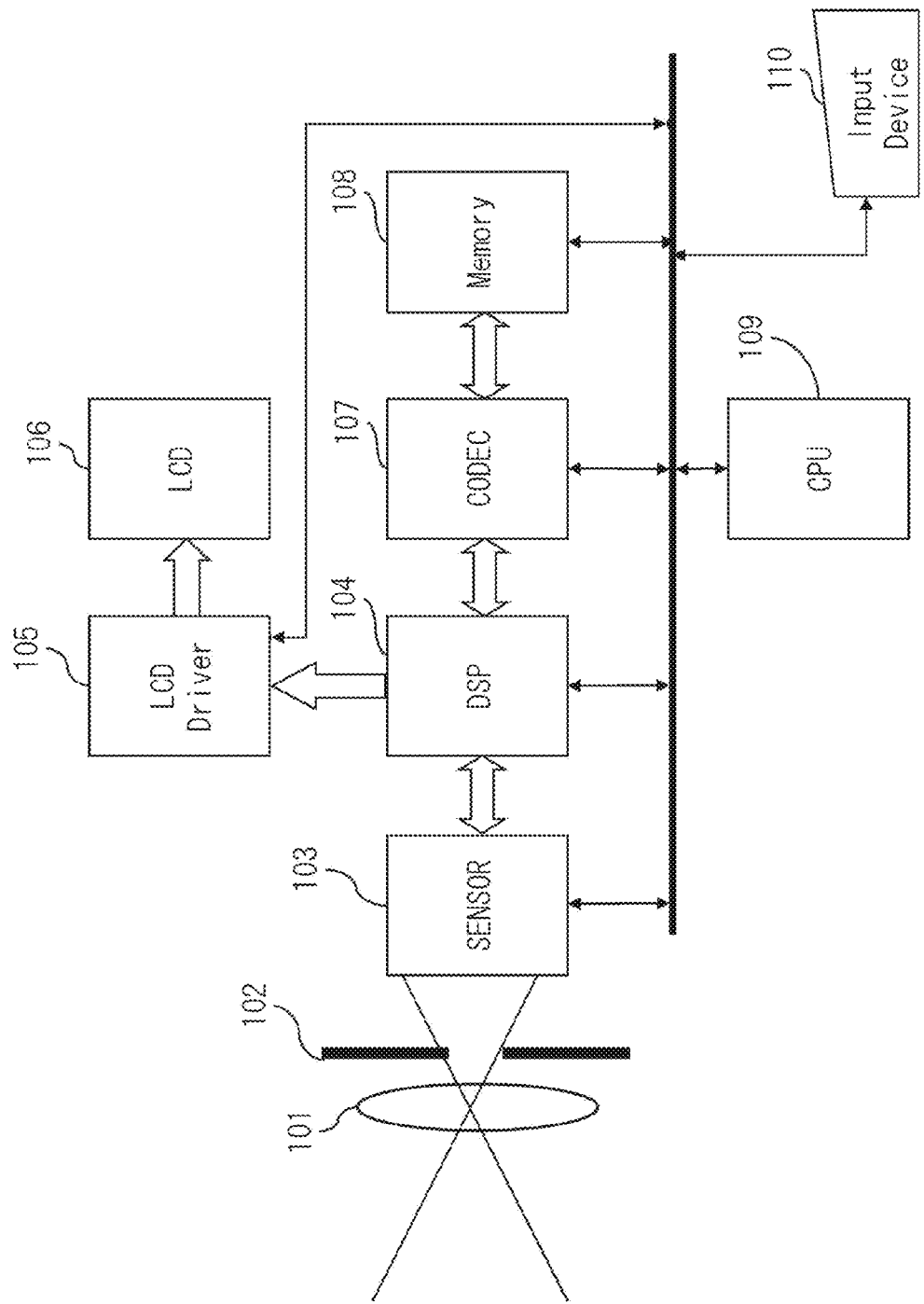
FIG. 1 is a view explaining an entire configuration example of an imaging apparatus.

Hereinafter, details of an imaging apparatus, an image sensor, an imaging control method and a program according to the present invention will be described with reference to the drawings. The details will be described according to the following items.

1. Configuration example of imaging apparatus
2. Exposure evaluation and exposure control value calculation processing
3. Configuration of image sensor and exposure control mechanism
4. Exposure control operation example 1: Normal uniform shutter operation
5. Exposure control operation example 2: Shutter operation which is different per pixel group
6. Second embodiment: Coexistence with column ADC
7. Third embodiment: Setting configuration of pixel group and overlap configuration of pixel group positions
8. Conclusion of configuration and effect according to present invention

1. CONFIGURATION EXAMPLE OF IMAGING APPARATUS

Hereinafter, embodiments of the present invention will be described. An example of a digital video camera will be described as one embodiment of the present invention.

A configuration and an operation of a camera will be described first, and then a configuration example of an image sensor device and details of exposure control using the image sensor will be described.

First, a configuration of an imaging apparatus (digital video camera) will be described with reference to FIG. 1. As illustrated in FIG. 1, the imaging apparatus has a lens 101, a diaphragm 102, an image sensor 103, a DSP block 104, a LCD driver 105, a LCD 106, a CODEC 107, a memory 108, a CPU 109 and an input device 110.

Meanwhile, the input device 110 includes operation buttons such as a shutter button of a camera body. Further, the DSP block 104 is a block which has a signal processing processor and image RAM which temporarily stores a captured image output from the image sensor 103. In the DSP block 104, the signal processing processor performs preprogrammed image processing with respect to image data stored in the image RAM. The DSP block will be simply referred to as a "DSP" below.

Incident light having passed an optical system and reached the image sensor 103 is converted into image data by the image sensor 103, and is temporarily stored in an image memory in the DSP 104. In a state during image capturing, the image sensor 103 is controlled to output image data at a fixed frame rate. The image data is output to the DSP 104 at the fixed rate, adequate image processing is performed therein and then the image data is output to one or both of the LCD driver 105 and the CODEC 107.

The LCD driver 105 converts the image data output from the DSP 104 into an analog signal, and outputs the analog signal to the LCD 106 to display thereon. This LCD 106 plays a role of a camera finder in the present embodiment. Further, the CODEC 107 encodes image data output from the DSP 104, and the encoded image data is recorded in the memory 108. Meanwhile, the memory 108 is a recording apparatus which uses, for example, a semiconductor, a magnetic recording medium, a magnetooptical medium and an optical recording medium.

In addition, the CPU 109 and the DSP 140 can execute various processing according to, for example, programs recorded in advance in the memory 108, and processing described below is also processing which can be executed according to a program.

2. EXPOSURE EVALUATION AND EXPOSURE CONTROL VALUE CALCULATION PROCESSING

The image sensor 103 can capture an image by setting different exposure per area of a pixel provided in the image sensor, that is, exposure times which are different in area units. For example, while bright exposure, that is, a long time exposure area, is set to an area in which there is a dark subject in one scene to be captured, dark exposure, that is, a short time exposure area, is set to an area in which there is a bright subject to capture an image and output image data.

By capturing an image by optimal exposure matching the brightness of the subject in each area unit, it is possible to generate image data of little noise or saturation.

Hereinafter, a specific configuration and processing of performing different exposure control in area units of the image sensor will be described.

Figure 2:
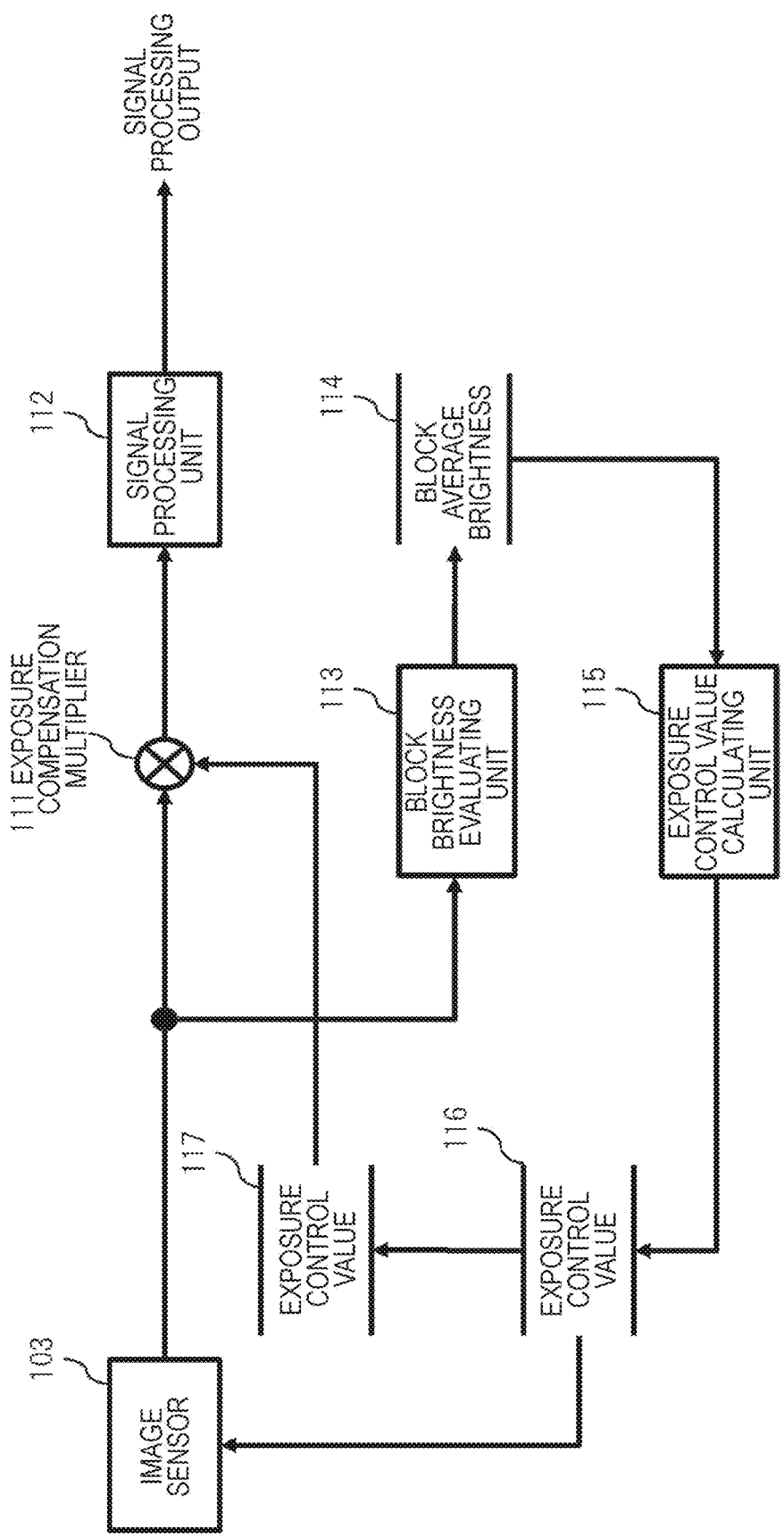
FIG. 2 is a view explaining a configuration of executing exposure control processing executed by the imaging apparatus.

FIG. 2 is a block diagram explaining a processing configuration of evaluating exposure and calculating an exposure control value according to the present embodiment.

In addition, in FIG. 2, figures indicated by parallel horizontal two lines such as a block average brightness 114, an exposure control value 116 and an exposure control value 117 indicate data or memory which store data. Further, figures indicated by rectangles such as the image sensor 103 represent processing executing units or processing.

In addition, exposure evaluation processing and exposure control value calculation processing performed by the configuration illustrated in FIG. 2 are processing executed by the DSP 104 illustrated in FIG. 1, and the configuration illustrated in FIG. 2 is a configuration set in the DSP 104.

The image data output from the image sensor 103 is captured by exposure which is different per area.

Hence, the image data output from the image sensor 103 illustrated in FIG. 1 is in a state in which signals are output based on a setting of an exposure time which is different per area, and therefore it is necessary to compensate for a difference in each exposure time and set a final output value. In addition, an exposure control value at a point of time when the image data output from the image sensor 103 is captured is stored in a memory in the DSP 104 as the exposure control value 117.

The image data output from the image sensor 103 is subjected by the exposure compensation multiplier 111 to compensation processing of calculating an output value as a final pixel value per pixel based on the exposure control value 117 stored in the memory. Subsequently, the image data is output to the signal processing unit 112, is subjected to camera signal processing such white balance adjustment, demosaic, linear matrix, gamma correction and aperture correction in the signal processing unit 112, and becomes data which can be output as a camera captured image.

Meanwhile, the image data output from the image sensor 103 is also input to the block brightness evaluating unit 113. The block brightness evaluating unit 113 evaluates a brightness average value per block area obtained by dividing an image into rectangular shapes. The evaluated brightness average value per block is stored in the memory as the block average brightness 114.

In addition, although an example will be described with the following embodiment where a block (pixel group) which is defined as an exposure control unit is a rectangular shape, the block is not limited to a rectangular shape.

The exposure control value calculating unit 115 calculates the exposure control unit to be input to the image sensor 103, based on the block average brightness 114. The exposure control value is calculated based on an average brightness of each block and a target brightness value set in advance. The target brightness value is an output brightness value from the image sensor 103 which is expected from exposure control, and is usually set to a brightness level of about 18% to 20% of a white level.

Thus, the image sensor 103 performs exposure control per block which is an area obtained by partitioning the imaging area into rectangular shapes. The exposure control value calculating unit 115 calculates an exposure control value which fully matches the block area, and stores the calculated exposure control value in the memory as the exposure control value 116.

The image sensor 103 captures image data of a next frame based on the exposure control value 116 matching the block stored in the memory. In addition, another exposure control value 117 illustrated in FIG. 2 is copy data of the exposure control value 116, and is used as information for performing exposure compensation for the image data to be output next from the image sensor 103.

A specific method of, at the exposure control value calculating unit 115, calculating an exposure control value per block will be described.

An output brightness value from each constituent pixel of the image sensor 103 is I.

The output brightness value: I is proportional to an amount of incident light: L, a square of a diaphragm diameter: $A^2$, a shutter time: T and a sensor sensitivity: S.

Consequently, it is possible to calculate the output brightness value I from each constituent pixel of the image sensor 103 according to following calculation formula (equation 1).

$$I = k \cdot L \cdot A^2 \cdot T \cdot S \quad \text{(Equation 1)}$$

In above (equation 1), k is a proportionality coefficient.

As is obvious from the above equation, when the amount of incident light L, the diaphragm A and the sensitivity S are fixed, the output brightness value I is proportional to the shutter time T. In addition, the shutter time corresponds to the exposure time.

Consequently, the shutter time Tt for obtaining a desired target brightness value It can be calculated according to following (equation 2) using the current output brightness value I and shutter time T.

$$Tt = T(It/I) \quad \text{(Equation 2)}$$

Although above (equation 1) and (equation 2) are calculation formulae of the output brightness value: I in a pixel unit of each constituent pixel of the image sensor 103 and the shutter time Tt for obtaining the desired target brightness value It, processing is performed in block (pixel group) units formed with a plurality of pixels according to the configuration of the present invention.

That is, by employing a configuration of calculating an average brightness of a current block (pixel group) as I and a current shutter time of each block (pixel group) as T in such a block (pixel group) unit, Tt (the shutter time Tt for obtaining the desired target brightness value It) is calculated according to above (equation 2) per block (pixel group), and is used as an exposure time per block (pixel group), that is, as an exposure control value.

Thus, according to the configuration of the present invention, instead of performing exposure control in pixel units based on brightness in pixel units, exposure control is executed in block units based on an average brightness in block (pixel group) units formed with a plurality of pixels.

3. CONFIGURATION OF IMAGE SENSOR AND EXPOSURE CONTROL MECHANISM

Next, a configuration of the image sensor 103 and an exposure control mechanism inside this configuration will be described.

Figure 3:
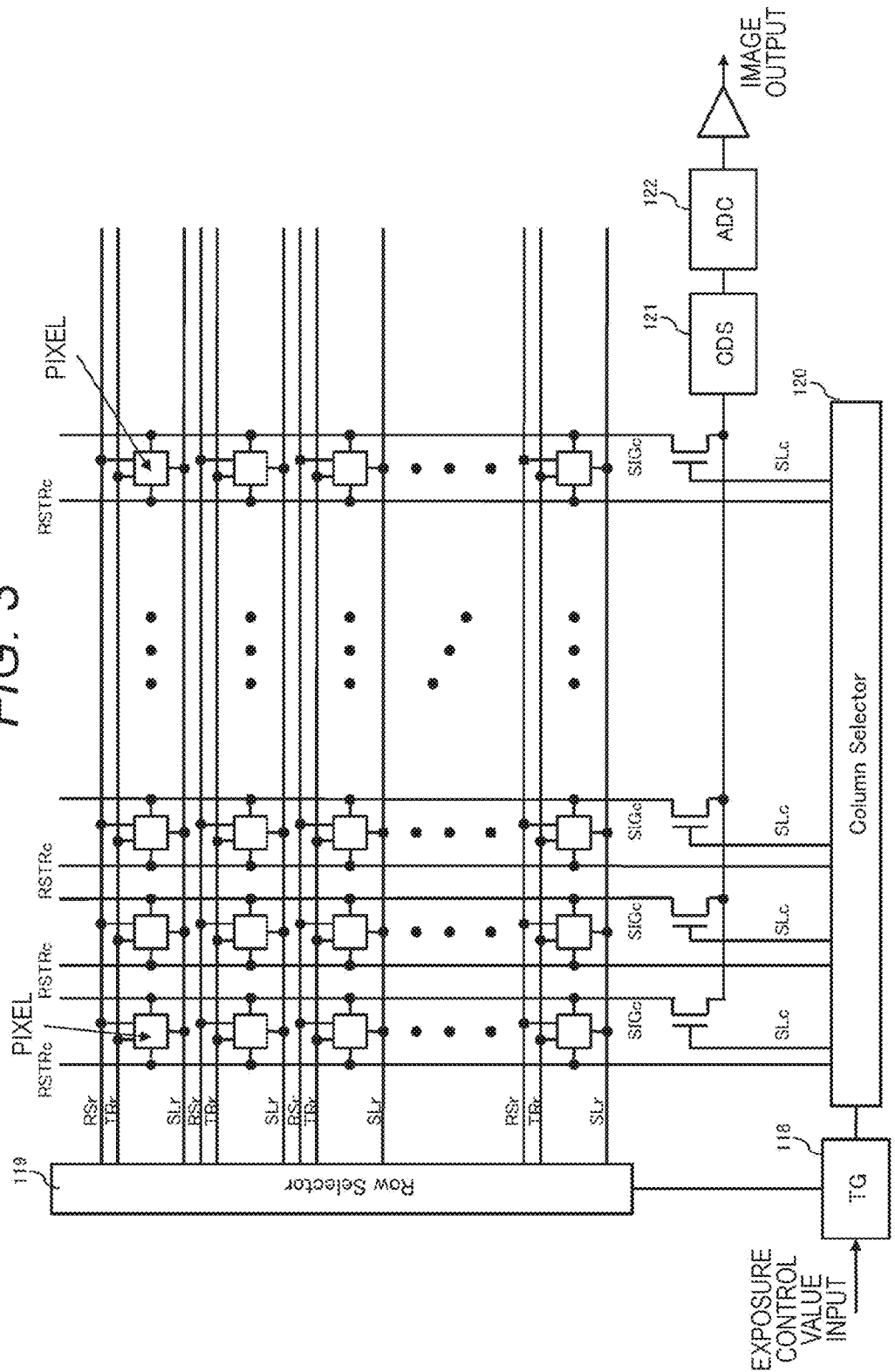
FIG. 3 is a view explaining a configuration example of an image sensor.

FIG. 3 is a view explaining a configuration of the image sensor according to the present embodiment. Each small square in FIG. 3 represents a pixel arranged in a two-dimensional grid pattern on the imaging area. That is, each square represents a pixel having a photoelectric converting element. Each pixel receives inputs of control signals RSr, TRr and SLr through three types of control lines extending in the horizontal direction, and receives an input of a control signal RSTRc through one type of a control signal extending in the vertical direction.

Further, each pixel outputs a pixel signal SIGc, that is, a charge which each pixel accumulates according to incident light, through a signal line extending in the vertical direction.

All control lines which transmit three types of control signals (RSr, TRr and SLr) in the horizontal direction are connected to a row selector 119, and the control signals are transmitted to each pixel from the row selector 119.

Further, all control lines in the vertical direction are connected to the column selector 120, and control signals are transmitted to each pixel from the column selector 120.

The row selector 119 and the column selector 120 are connected to a timing generator (TG) 118, and the timing generator (TG) 118 receives for the image sensor 103 an input of the exposure control signal from an outside.

Meanwhile, the exposure control signal input from the outside refers to the exposure control value 116 described with reference to FIG. 2, that is, a block unit exposure control value.

The timing generator (TG) 118 converts the block unit exposure control value into timing information of block unit shutter control, and transmits the timing information to the row selector 119 and the column selector 120. When receiving the timing information, the row selector 119 and the column selector 120 generate control signals per row and per column, and transmit the control signals RSr, TRr, SLr and RSTRc to each pixel.

The output pixel signal SIGc output from each pixel passes a switch which performs selection in column units. The switch is opened and closed according to a column selection signal SLc of the column selector 120. A pixel signal SIGc from each pixel of the column selected according to the column selection signal SLc is input to a CDS (Correlated Double Sampling circuit) 121, has reset noise suppressed, is next input to an ADC (Analog-Digital Converter circuit), is converted from an analog signal to a digital signal and then is output from the image sensor as an image output.

Figure 4:
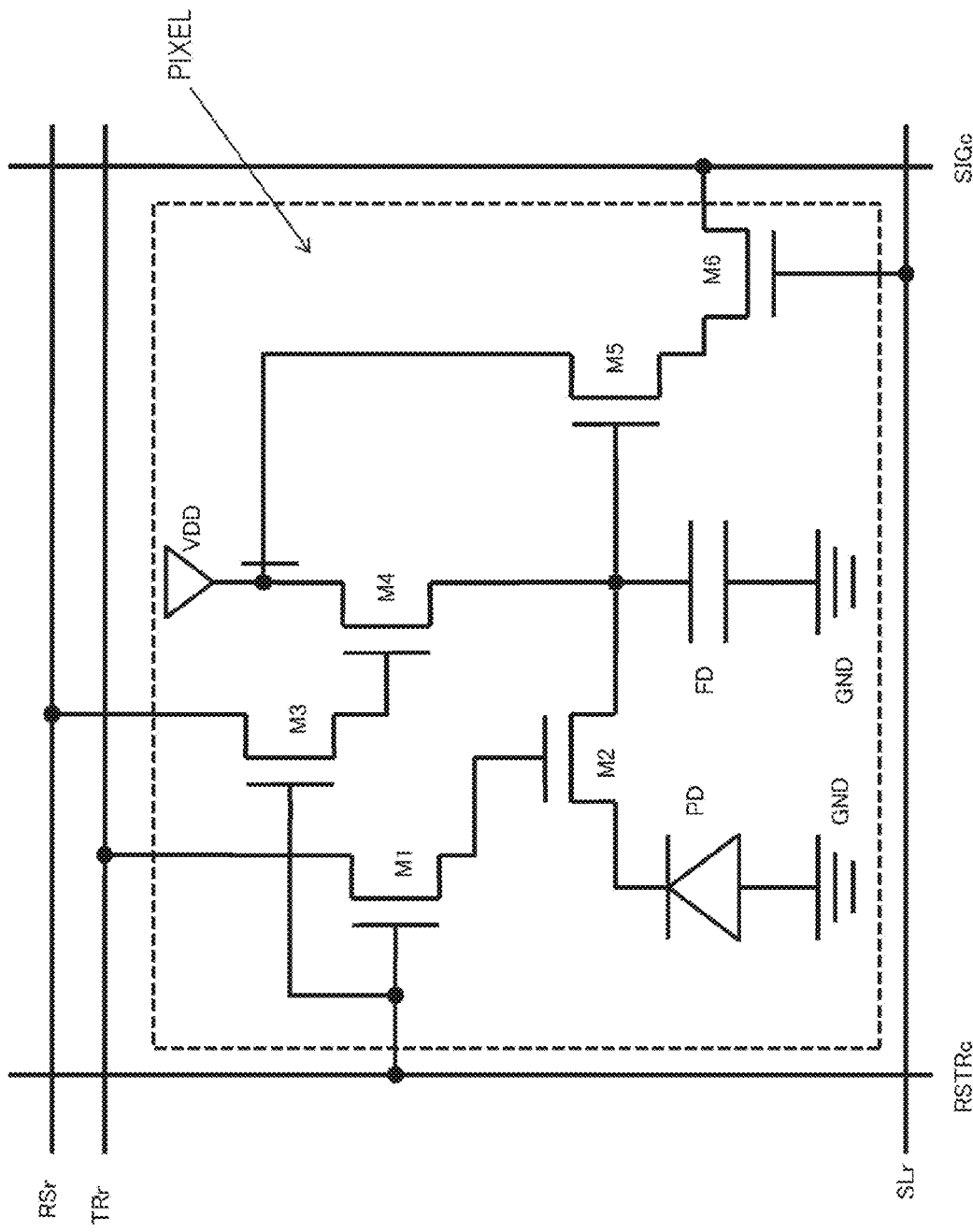
FIG. 4 is a view illustrating an equivalent circuit for explaining a configuration example of one pixel in the image sensor.

FIG. 4 is a view illustrating an equivalent circuit for explaining a configuration example of one pixel in the image sensor according to the present embodiment. A portion encircled by a broken line quadrangle in FIG. 4 is a configuration corresponding to one pixel. One pixel receives an input of the control signals RSr, TRr and SLr from the three types of horizontally extending control lines.

Pixels belonging to the same row receive inputs of these control signals RSr, TRr and SLr from the same control line. Further, one pixel receives an input of the control signal RSTRc through a vertically extending control line. All pixels belonging to the same column receive an input of this control signal RSTRc from the same control line.

When light is incident on a pixel, a charge matching the amount of light is produced by photoelectric conversion in the photodiode PD. The charge accumulated in the photodiode PD is transferred to a floating diffusion FD through a transistor M2. A gate of the transistor M2 is controlled according to the control signals TRr and RSTRc through a transistor M1. When energized with the charge, a transistor M4 performs an operation of resetting the charge accumulated in the floating diffusion FD. The gate of the transistor M4 is controlled according to the control signals RSr and RSTRc through the transistor M3. The charge accumulated in the floating diffusion FD is amplified by a transistor M5, and an output pixel signal SIGc is output through a transistor M6. The gate of the transistor M6 is controlled according to the control signal SLr.

In the present embodiment, a pixel performs operations of two patterns, that is, two processing of (a) charge accumulation processing based on exposure processing "SHUTTER" and (b) accumulated charge output processing based on read processing "READ".

When neither (a) nor (b) is performed, an accumulated state of the exposed charge is maintained.

Figure 5:
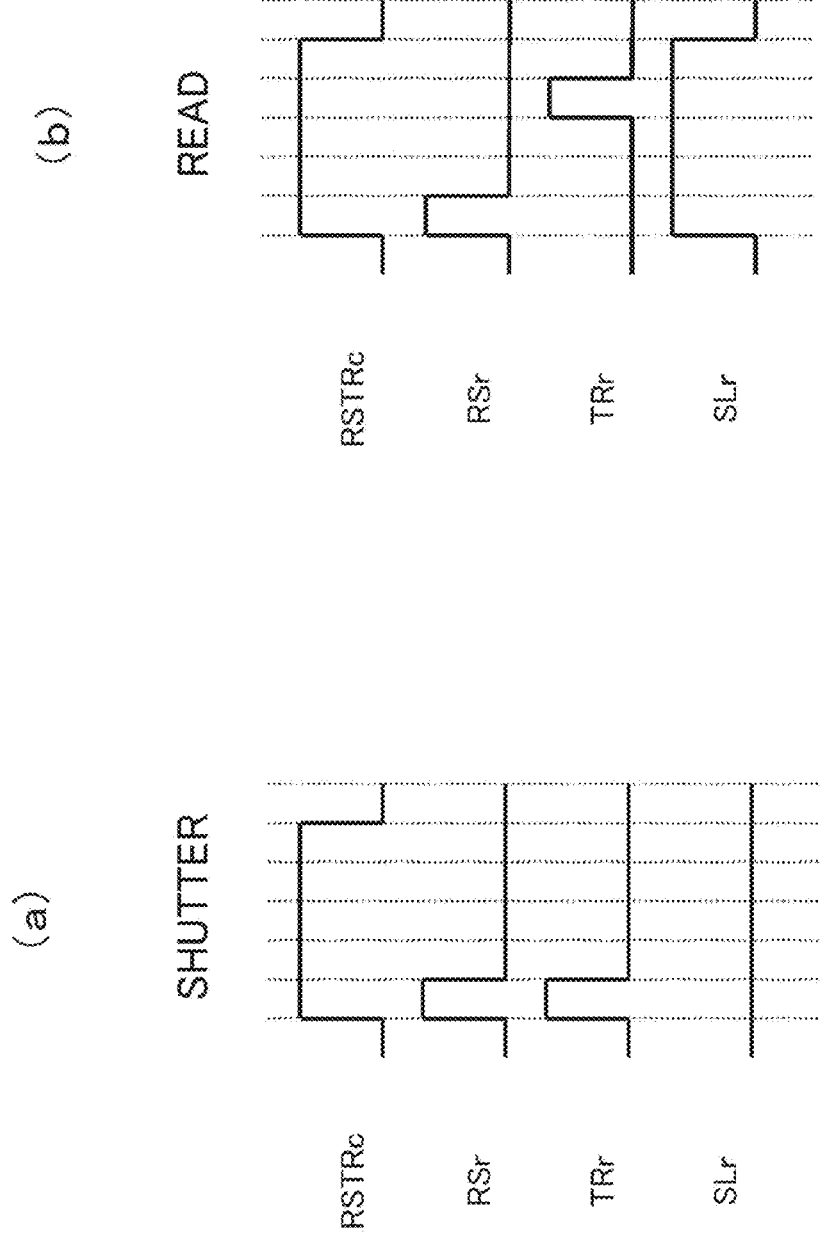
FIG. 5 is a view explaining control signal patterns upon operations of two processing of (a) charge accumulation processing based on exposure processing "SHUTTER" and (b) accumulated charge output processing based on read processing "READ".

FIG. 5 illustrates a timing chart explaining control signal patterns upon operations of two processing of (a) charge accumulation processing based on exposure processing "SHUTTER" and (b) accumulated charge output processing based on read processing "READ".

The horizontal axis is a time.

By maintaining an active state when a pixel of a column is in a pixel control period, the control signal RSTRc in the column direction generates a state in which this pixel can be controlled.

Further, upon the exposure processing "SHUTTER" operation, the control signals RSr and TRr in the row direction simultaneously become active while RSTRc is active. By this means, the transistors M2 and M4 in FIG. 4 are simultaneously placed in the opened state, and the accumulated charges in the photodiode PD and the floating diffusion FD are reset, that is, an operation of starting exposure by means of an electronic shutter is performed.

Further, in the read "READ" operation, the control signal RSTRc and the control signal SLr in the row direction simultaneously maintain the active state in a pixel control period. Furthermore, an operation is performed such that, during the pixel control period, sequentially the control signal RSr first becomes active and then the control signal TRr becomes active. When the control signal RSr becomes active, the transistor M4 is placed in an opened state, the charge in the floating diffusion FD is reset and, at the same time, the transistor M6 is placed in the opened state according to the control signal SLr, so that the output pixel signal SIGc in the reset state is output.

Further, when the control signal TRr becomes active, the transistor M2 is placed in the opened state, the charge accumulated in the photodiode PD is transferred to the floating diffusion FD. At this point of time, the transistor M4 is in the closed state and the transistor M6 is continuously in the opened state, so that the output pixel signal SIGc matching the transferred charge is output through a signal line. The signals which are in reset and accumulated states and which are sequentially output by the READ operation are held in the CDS, and signals from which reset noise is canceled by a differential detection operation in the CDS are generated.

An example of a correspondence between an internal configuration of a row selector and a block (pixel group) set to the image sensor 103 will be described with reference to FIG. 6.

One of characteristics of the image sensor 103 which realizes the present invention includes performing control such that an exposure time (shutter time) is different per pixel group formed with a plurality of pixels.

The embodiment described herein is an example where a block (pixel group) is formed per area obtained by dividing the imaging area of the image sensor 103 into rectangular block shapes to perform control such that the exposure time (shutter time) is different per block (pixel group).

Figure 6:
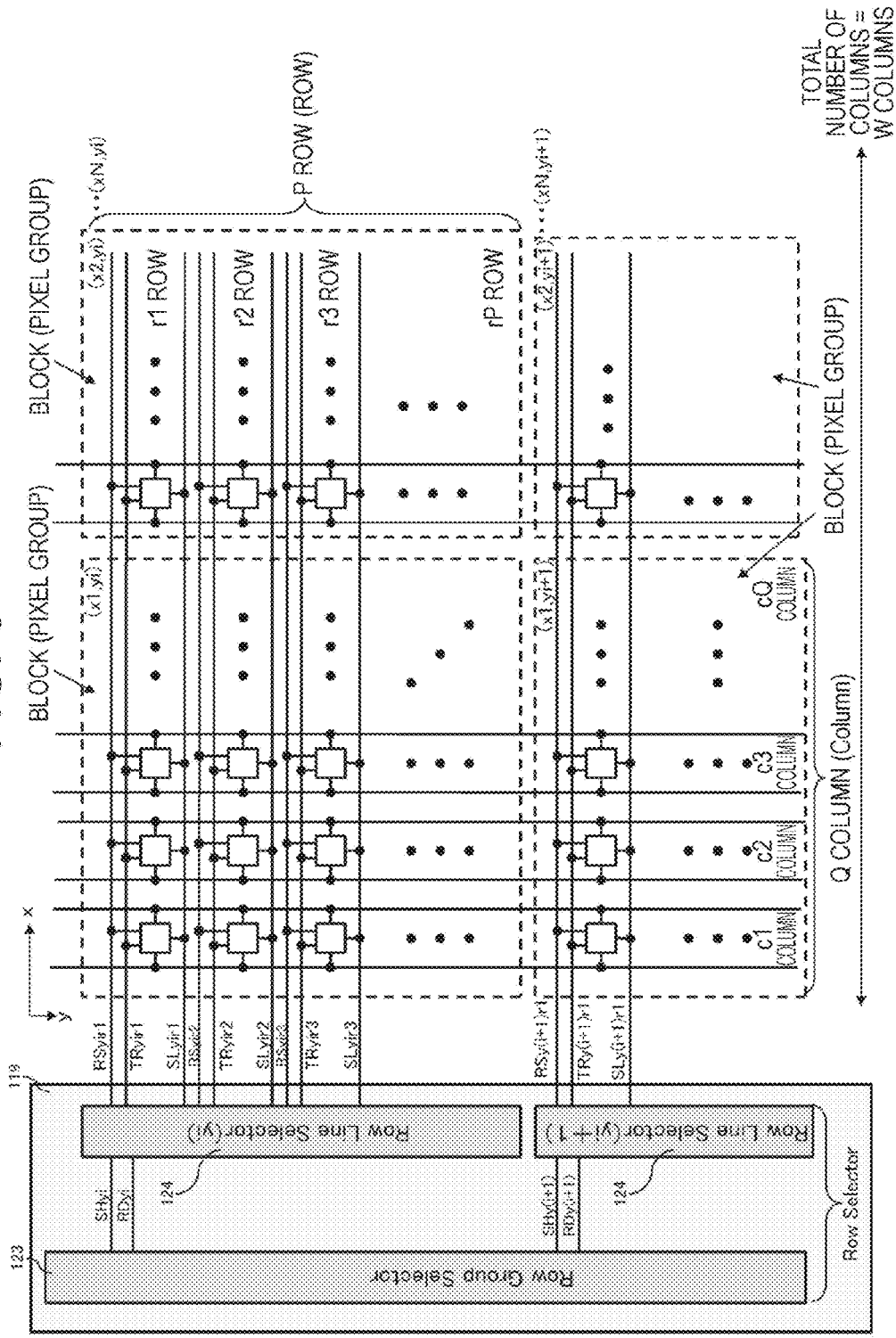
FIG. 6 is a view explaining an example of a correspondence between an internal configuration of a row selector and a block (pixel group) set to an image sensor 103.

FIG. 6 illustrates rectangular blocks (pixel groups) set to the image sensor 103 as broken line quadrangles.

FIG. 6 illustrates an example where one block is formed with pixels of P rows and Q columns. In addition, various settings of block setting are possible.

The total number of pixel columns of the whole image sensor is W.

In the block (pixel group), the horizontal direction is an x direction, the vertical direction is a y direction and a block identifier (address) of, for example, an upper left block (pixel group) in FIG. 6 is (x1, yi).

A block to the right of the block (x1, yi) is a block (x2, yi).

A block adjacent to and below the block (x1, yi) is a block (x1, yi+1).

A block at a right end in the horizontal direction of (x1, yi) is a block (xN, yi), and N blocks (x1, yi) to (xN, yi) are set in the horizontal direction of one block.

To control a block (pixel group) unit exposure time, that is, to realize shutter control, the internal configuration of the row selector 119 according to the present embodiment employs a configuration illustrated in FIG. 6.

As illustrated in FIG. 6, the row selector 119 adopts a hierarchical structure of a row group selector 123 which generates block (pixel group) unit control signals (SHy and RDy), and a plurality of row line selectors 124 which receives inputs of the block (pixel group) unit control signals (SHy and RDy) from the row group selector 123 and generates control signals to be output to pixels in the block (pixel group).

The row group selector 123 selects and transmits the above two types of (a) SHUTTER control start (SHy) and (b) READ control start (RDy) control signals to each row line selector 124.

The (a) SHUTTER control start (SHy) and (b) READ control start (RDy) control signals include designation information which indicates transmission of a timing to (a) start exposure or (b) start reading, and indicates to which one of a plurality of blocks (pixel groups) aligned in the horizontal direction which one row line selector 124 is in charge of is controlled. The row line selector 124 receives an input of a control signal SHy or RDy from the row group selector 123, and transmits a control signal pattern of one of two processing of (a) charge accumulation processing based on exposure processing "SHUTTER" and (b) accumulated charge output processing based on read processing "READ" described above with reference to FIG. 5, to all pixels in the block (pixel group) corresponding to block designation information included in the input control signal.

One block (pixel group) includes a plurality of blocks of several rows and several columns. For example, with an example illustrated in FIG. 6, P×Q pixels are included in one block. Hence, to finish an operation of one block (pixel group), it is necessary to shift by an adequate time a control signal to be given to each pixel in the block, and give the control signal. The row line selector 124 illustrated in FIG. 6 generates a control signal such that all pixels in the pixel group operates at adequate timings.

In the present embodiment, an operation of performing sequential scan in column units is performed in the column direction, so that the hierarchical structure of the column selector is not necessary.

Figure 7:
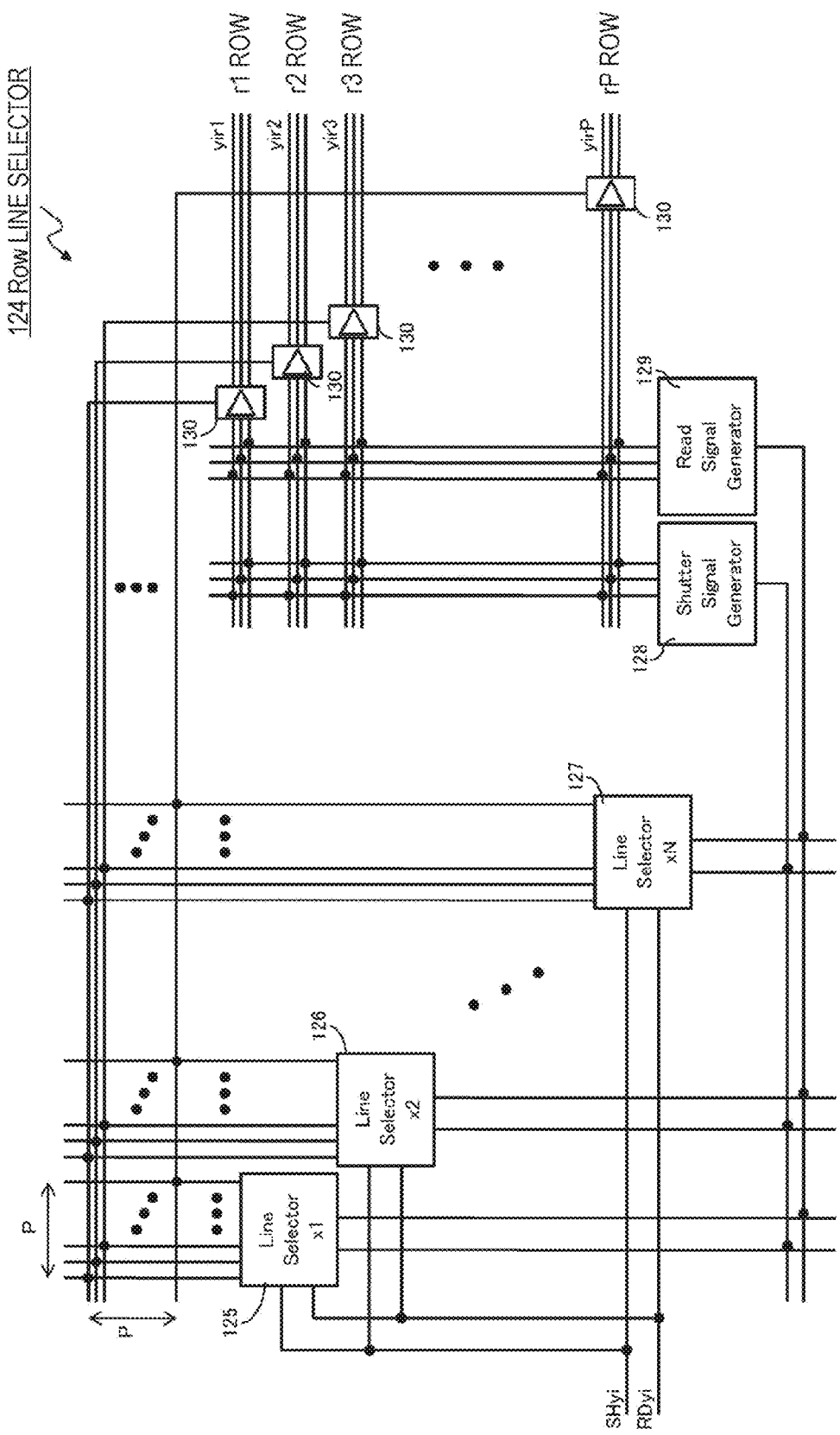
FIG. 7 is a block diagram explaining an internal configuration of one row line selector 124 illustrated in FIG. 6.

FIG. 7 is a block diagram explaining an internal configuration of one row line selector 124 illustrated in FIG. 6. One row line selector has N line selectors 125, 126, . . . and 127, a SHUTTER control signal generator 128, a READ control signal generator 129 and P row selection switches 130.

Meanwhile, N corresponding to the number of line selectors is the number of blocks (pixel groups) which the same row line selector is in charge of and which are aligned in the horizontal direction.

Further, P corresponding to the number of row selection switches 130 is the number of rows which the same row line selector is in charge of.

Each line selector 125, 126, . . . and 127 receives the (a) SHUTTER control start (SHy) or (b) READ control start (RDy) control signal which is a control signal from the row group selector 123, generates a timing signal for transmitting a control signal to each pixel when the control signal is a control signal for a block (pixel group) which each line selector is in charge of, and outputs the timing signal to the SHUTTER control signal generator 128, the READ control signal generator 129 and the P row selection switches 130 to control.

That is, each of the N line selectors 125, 126, . . . and 127 is set to each of N blocks (image groups) in the horizontal direction, and is set an output timing of a control signal matching each block.

The SHUTTER control signal generator 128 and the READ control signal generator 129 are circuits which generate pixel control patterns illustrated in FIGS. 5(a) and 5(b).

The SHUTTER control signal generator 128 is a circuit which generates a pixel control pattern which is illustrated in FIG. 5(a) and which is used in (a) "SHUTTER" processing as exposure processing.

The READ control signal generator 129 is a circuit which generates a pixel control pattern which is illustrated in FIG. 5(b) and which is used in (b) "READ" processing as read processing.

One of the line selectors 125, 126, . . . and 127 receives an input of a control signal (timing signal) from a line selector which is operating in an active state, generates above (a) and (b), that is, the control signals in FIGS. 5(a) and (b) and outputs the outputs to all rows. The control signals pass the row selection switch 130 once per row, and the row selection switch 130 is placed in the opened state according to the control signal (timing signal) output from one of the N line selectors 125, 126, . . . and 127, and transmits a pixel control signal to the row.

Figure 8:
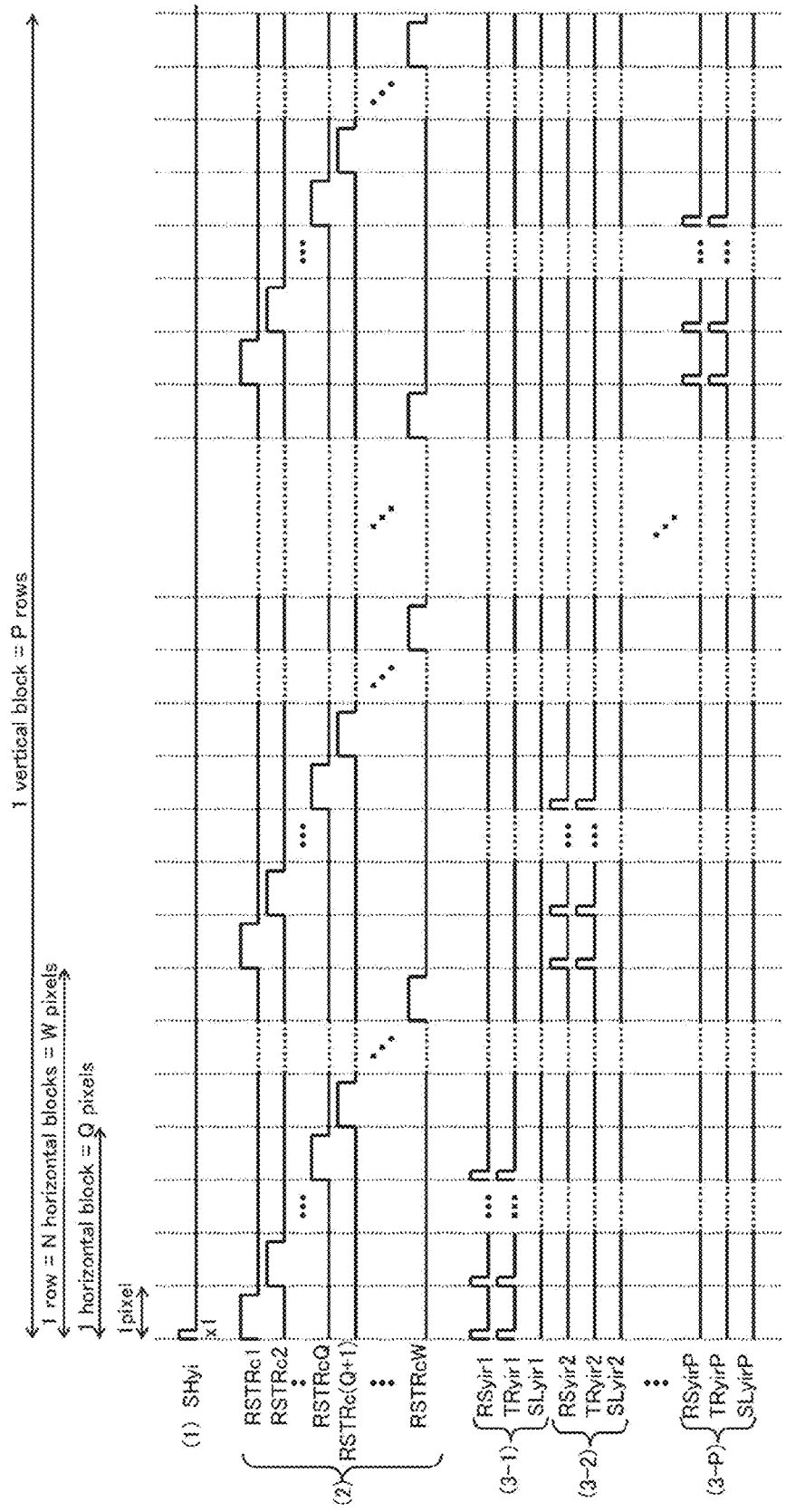
FIG. 8 is a timing chart explaining an operation of the row line selector when a control signal SHy indicating SHUTTER control start which designates exposure processing start is input.

FIG. 8 is a timing chart explaining an operation of the row line selector 124 when the control signal SHy indicating SHUTTER control start which commands exposure processing start is input to one row line selector 124 illustrated in FIG. 7.

This FIG. 8 illustrates a processing example upon input of a SHUTTER start control signal (SHy) for the leftmost block (pixel group) (x1) of blocks (x1, yi) to (xN, yi) which are control target blocks (pixel groups) of an i-th row line selector (yi).

In the timing chart illustrated in FIG. 8, the horizontal axis indicates the time, and each line indicates from the top (1) the control signal SHy to a yi-th row line selector 124 (see FIG. 6),
(2) control signals RSTRc (c1-th, c2-th, . . . , cQ-th, c(Q+1)-th, . . . , and cW-th columns from the top) controlled by the column selector 120 (see FIG. 3), and
(3) (3-1) control signals RSr, TRr and SLr to a r1-th row, (3-2) control signals RSr, TRr and SLr to a r2-th row, . . . , and (3-P) control signals RSr, TRr and SLr to a rP-th row which the yi-th row line selector 124 (see FIG. 6) is in charge of.

Meanwhile, Q refers to the number of columns belonging to a block (x1, yi) which is a x1-th block (pixel group) of control target blocks (pixel groups) (x1, yi) to (xN, yi) of the i-th row line selector (yi).

W refers to the total number of columns of the image sensor.

P is the number of rows belonging to the block (x1, yi).

The column selector 120 repeats an operation of sequentially scanning all columns: c1 to cW of the image sensor in column units of the image sensor 103 at all times irrespectively of an exposure control input. That is, a column control signal RSTRc repeats a cycle in which c1 to cW sequentially become active. A period in which RSTRc holds an active state of one column corresponds to a pixel control period.

When the row group selector 123 outputs a control signal SHy, that is, a signal for starting a SHUTTER operation, to a pixel group of the block (x1, yi), x1 is the leftmost pixel group, and the control signal SHy is transmitted to the yi-th row line selector 124 in synchronization with RSTRc1.

The x1-th line selector immediately enters an active state, and the yi-th row line selector which has received the control signal SHy first places the SHUTTER control signal generator 128 in an active state to start generating a SHUTTER control signal.

At a timing to transmit a control signal to each pixel, each row selection switch 130 illustrated in FIG. 7 is controlled such that the SHUTTER control signal is transmitted to each row: r1 row to rP row of the control target block.

As a result, as indicated by (3-1) in FIG. 8, SHUTTER control signals (signals RSyir1 and TRyir1) to the r1-th row (the r1-th row illustrated in FIG. 6) is first transmitted Q times in synchronization with RSTRc1 to RSTRcQ.

These control signals correspond to Q pixels (the c1 column to the cQ column) of a control block which is, for example, the first row (r1 row) of the upper left block (x1, yi) illustrated in, for example, FIG. 6.

Subsequently, there is no column in periods of RSTRc (Q+1) to RSTRcW, and therefore a control signal is not generated. That is, a processing period matching a column in the pixel group of the upper left end block (x1, yi) illustrated in FIG. 6 has not come, and therefore control signals [=SHUTTER control signals (signals RSyir1 and TRyir1)] to the r1-th row indicated by (3-1) in FIG. 8 are not generated.

Next, as indicated by (3-2) in FIG. 8, SHUTTER control signals (signals RSyir2 and TRyir2) to the r2-th row (the r2 row illustrated in FIG. 6) are transmitted Q times in synchronization with RSTRc1 to RSTRcQ.

These control signals correspond to Q pixels (the c1 column to the cQ column) of a control block which is, for example, the second row (r2 row) of the upper left block (x1, yi) illustrated in, for example, FIG. 6.

Subsequently, there is no column in periods of RSTRc (Q+1) to RSTRcW, and therefore a control signal is not generated.

Subsequently, as indicated by (3-1) to (3-P) in FIG. 8, the same operation is repeated until rP. That is, the same processing is performed for a P-th row (rP row) of the upper left block (x1, yi) illustrated in FIG. 6. By this means, the SHUTTER operation is completed for all pixels in a control target block (pixel group) which is, for example, the upper left block (x1, yi) illustrated in FIG. 6, so that an operation with respect to an input of the control signal SHy is completed. In addition, to realize this series of timing control, a row line selector only needs to have a simple pattern generating circuit formed by, for example, a counter.

Next, an operation of the row line selector 124 when the control signal RDy indicating READ control start which commands read processing start is input to one row line selector 124 illustrated in FIG. 7 will be described with reference to a timing chart illustrated in FIG. 9.

Similar to FIG. 8 described above, this FIG. 9 also illustrates a processing example upon input of a READ start control signal (RDy) for the leftmost block (pixel group) (x1) of blocks (x1, yi) to (xN, yi) which are control target blocks (pixel groups) of an i-th row line selector (yi)

Figure 9:
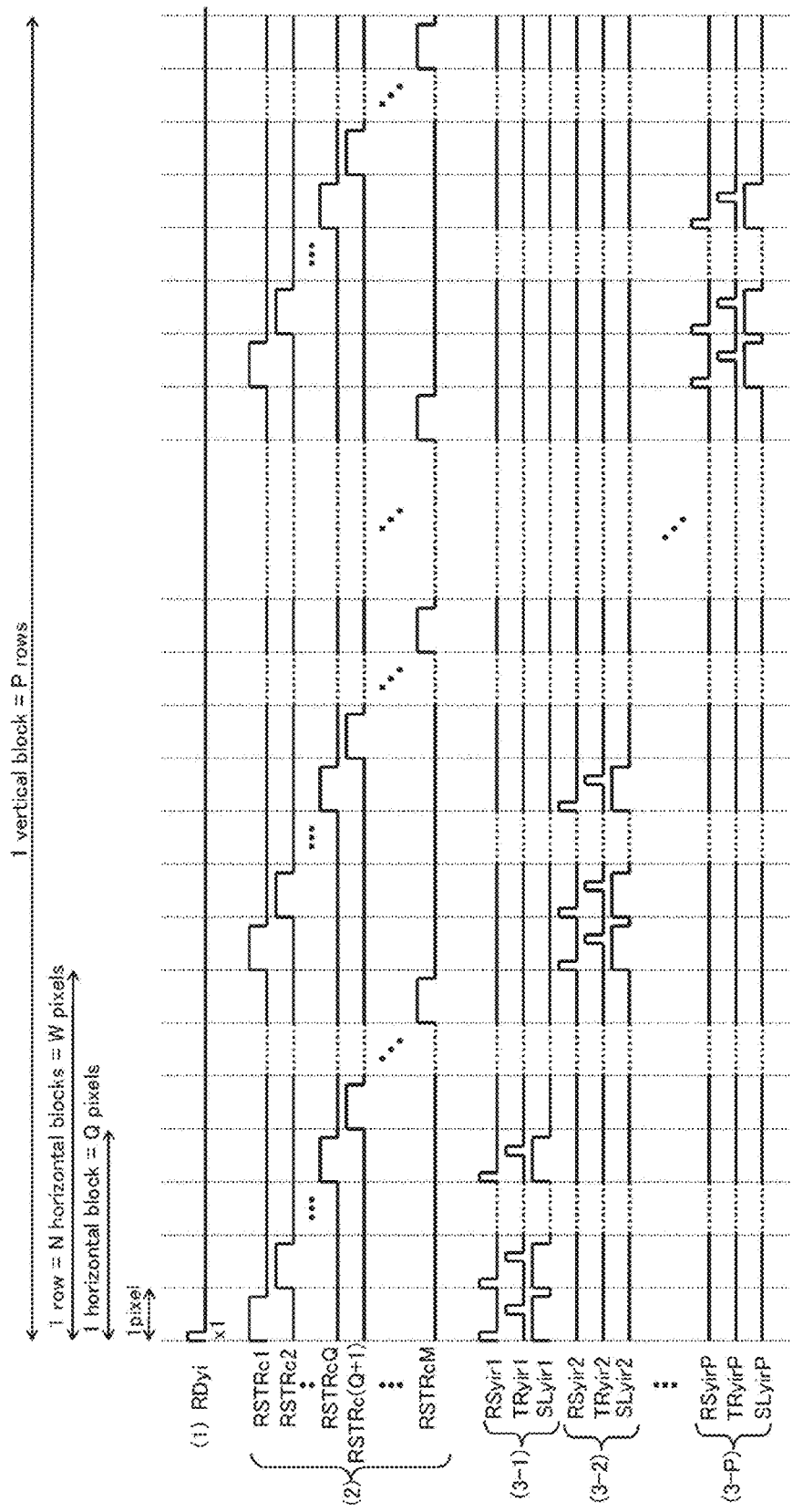
FIG. 9 is a view explaining an operation of the row line selector when a control signal RDy indicating READ control start which commands read processing start is input.

In the timing chart illustrated in FIG. 9, the horizontal axis indicates the time, and each line indicates from the top
(1) the control signal RDy to a yi-th row line selector 124 (see FIG. 6),
(2) control signals RSTRc (the c1-th, c2-th, . . . , cQ-th, c(Q+1)-th, . . . , and cW-th columns from the top) controlled by the column selector 120 (see FIG. 3), and
(3) (3-1) control signals RSr, TRr and SLr to a r1-th row, (3-2) control signals RSr, TRr and SLr to a r2-th row, . . . , and (3-P) control signals RSr, TRr and SLr to a rP-th row which the yi-th row line selector 124 (see FIG. 6) is in charge of.

Meanwhile, Q refers to the number of columns belonging to a block (x1, yi) which is an x1-th block (pixel group) of control target blocks (pixel groups) (x1, yi) to (xN, yi) of the i-th row line selector (yi).

W refers to the total number of columns of the image sensor.

P is the number of rows belonging to the block (x1, yi).

The column selector 120 repeats an operation of sequentially scanning all columns: c1 to cW of the image sensor in column units of the image sensor 103 at all times irrespectively of an exposure control input. That is, a column control signal RSTRc repeats a cycle in which c1 to cW sequentially become active. A period in which RSTRc holds an active state of one column corresponds to a pixel control period.

When the row group selector 123 outputs a control signal RDy, that is, a signal for starting a READ operation, to a pixel group of the block (x1, yi), x1 is the leftmost pixel group, and the control signal RDy is transmitted to the yi-th row line selector 124 in synchronization with RSTRc1.

The x1-th line selector immediately enters an active state, and the yi-th row line selector which has received the control signal RDy first places the READ control signal generator 129 in an active state to start generating a READ control signal.

At a timing to transmit a control signal to each pixel, each row selection switch 130 illustrated in FIG. 7 is controlled such that the READ control signal is transmitted to each row: r1 row to rP row of the control target block.

As a result, as indicated by (3-1) in FIG. 9, READ control signals (signals RSyir1, TRyir1 and SLyir1) to the r1-th row (the r1-th row illustrated in FIG. 6) is first transmitted Q times in synchronization with RSTRc1 to RSTRcQ.

These control signals correspond to Q pixels (the c1 column to the cQ column) of a control target block which is, for example, the first row (r1 row) of the upper left block (x1, yi) illustrated in, for example, FIG. 6.

Subsequently, there is no column in periods of RSTRc (Q+1) to RSTRcW, and therefore a control signal is not generated. That is, a processing period matching a column in the pixel group of the upper left end block (x1, yi) illustrated in FIG. 6 has not come, and therefore control signals [=READ control signals (signals RSyir1, TRyir1 and SLyir1)] to the r1-th row indicated by (3-1) in FIG. 9 are not generated.

Next, as indicated by (3-2) in FIG. 9, READ control signals (signals RSyir2, TRyir2 and SLyir2) to the r2-th row (the r2 row illustrated in FIG. 6) is transmitted Q times in synchronization with RSTRc1 to RSTRcQ.

These control signals correspond to Q pixels (the c1 column to the cQ column) of a control target block which is, for example, the second row (r2 row) of the upper left block (x1, yi) illustrated in, for example, FIG. 6.

Subsequently, there is no column in periods of RSTRc (Q+1) to RSTRcW, and therefore a control signal is not generated.

Subsequently, as indicated by (3-1) to (3-P) in FIG. 9, the same operation is repeated until rP. That is, the same processing is performed for a P-th row (rP row) of the upper left block (x1, yi) illustrated in FIG. 6. By this means, the READ operation is completed for all pixels in a control target block (pixel group) which is, for example, the upper left block (x1, yi) illustrated in FIG. 6, so that an operation with respect to an input of the control signal RDy is completed. In addition, to realize this series of timing control, a row line selector only needs to have a simple pattern generating circuit formed by, for example, a counter.

When a block unit exposure control input is provided to the image sensor employing the above configuration, it is possible to perform an operation of capturing images using shutters which are different per block.

Hereinafter, entire exposure control operation examples of the image sensor 103 will be described.

4. EXPOSURE CONTROL OPERATION EXAMPLE 1

Normal Uniform Shutter Operation

First, an exposure control operation example 1 will be described where, similar to a conventional image sensor, it is possible to perform shutter control image capturing which sets a full and uniform exposure period to an imaging area of the image sensor.

In addition, for ease of description, conditions are that the number of blocks (pixel groups) in the image sensor is 3 (x1 to x3) in the horizontal direction and 3 (y1 to y3) in the vertical direction and each block (pixel group) includes two rows (r1 to r2).

Figure 10:
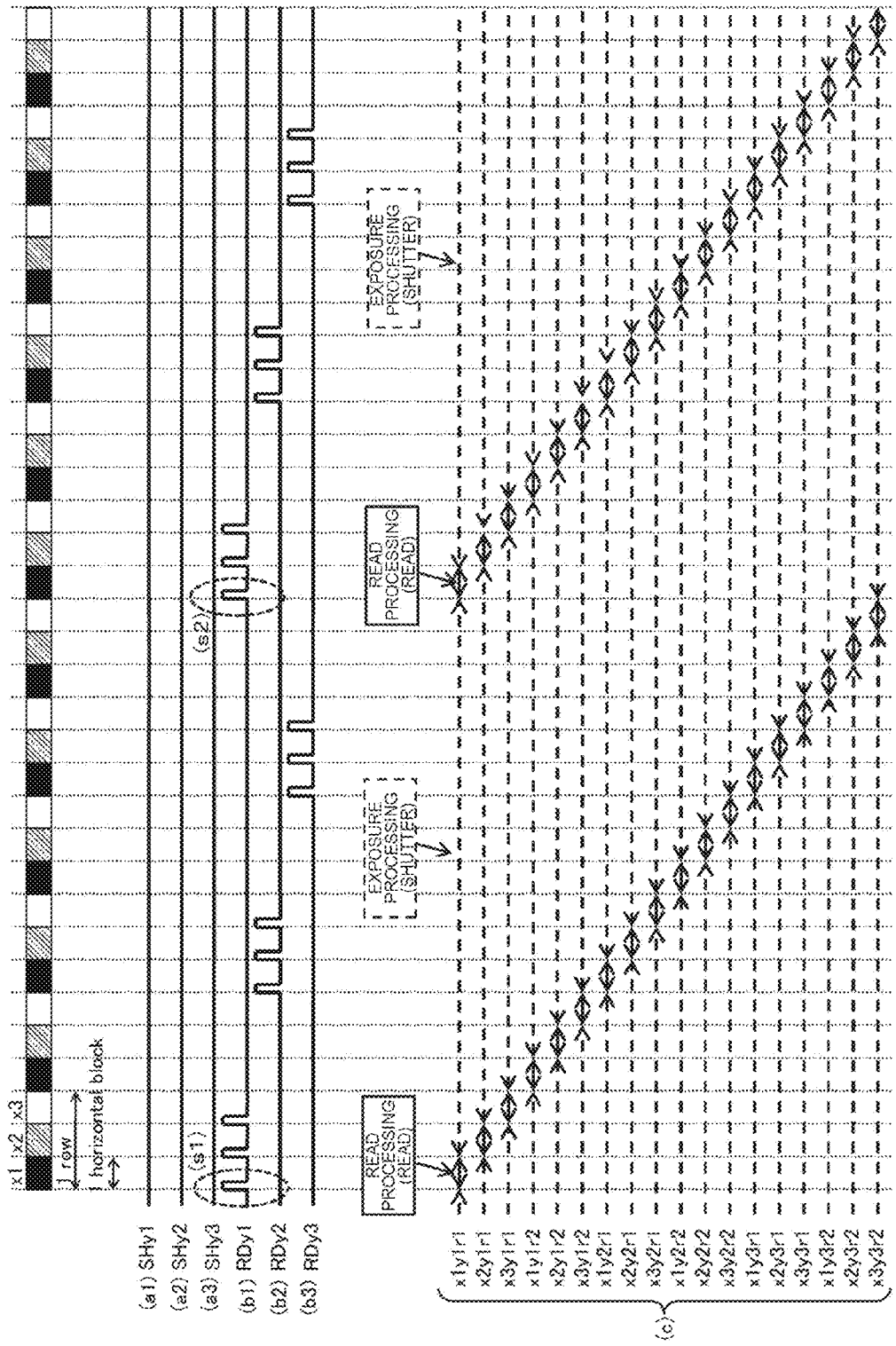
FIG. 10 is a timing chart explaining control of a row group selector when an image is captured by performing normal exposure control (shutter control) for a full and uniform exposure time.

FIG. 10 is a timing chart explaining control of a row group selector when an image is captured by performing normal exposure control for a full and uniform exposure time.

The horizontal axis indicates the time, and sections indicated by vertical broken lines indicate Q pixel control periods corresponding to a width of one block (one pixel group). That is, a pixel group control period is switched in this section, and areas which are painted in three ways are set at an upper portion in FIG. 10 for ease of understanding of a control period of a corresponding pixel group (one of x1, x2 and x3).
(1) Black=x1
(2) Diagonal line=x2
(3) White=x3

These correspond to three blocks arranged in the horizontal direction.

In the timing chart illustrated in FIG. 10, three blocks in the horizontal direction and three blocks in the vertical direction in the image sensor, that is, nine blocks of
(x1, y1), (x2, y1), (x3, y1),
(x1, y2), (x2, y2), (x3, y2),
(x1, y3), (x2, y3) and (x3, y3)
as block identifiers are control targets.

The conditions are that the number of blocks (pixel groups) in the horizontal direction is three, and one row=all columns is true in three sections. Six lines illustrated in an upper half in FIG. 10 indicate control signals output from the row group selector 123 to each row line selector 124.

From the top line, these signals are
(a1) SHy [SHUTTER (exposure) start control signal] to the y1-th row line selector,
(a2) SHy [SHUTTER (exposure) start control signal] to the y2-th row line selector,
(a3) SHy [SHUTTER (exposure) start control signal] to the y3-th row line selector, (b1) RDy [READ start control signal] to the y1-th row line selector,
(b2) RDy [READ start control signal] to the y2-th row line selector and
(b3) RDy [READ start control signal] to the y3-th row line selector.

Normal full and uniform shutter control is realized by a sequence which uses only the read control signals RDy indicated by (b1) to (b3) without using the shutter control signals SHy indicated by (a1) to (a3).

First, as indicated by (b1) in FIG. 10, the READ start control signal (RDy) is continuously given to pixel groups of x1, x2 and x3 of the y1-th row line selector, and then is stopped for one row.

Next, as indicated by (b2) in FIG. 10, the READ start control signal (RDy) is continuously given to pixel groups of x1, x2 and x3 of the y2-th row line selector, and then is stopped for one row.

Next, as indicated by (b3) in FIG. 10, the READ start control signal (RDy) is continuously given to pixel groups of x1, x2 and x3 of the y3-th row line selector, and then is stopped for one row.

Subsequently, the same sequence is repeated.

By performing control according to this sequence, each row line selector performs an operation described above with reference to FIG. 9, so that the READ operation of pixels are performed in order of pixels in the horizontal direction and then in order of lines in the vertical direction.

This is indicated by (c) in the lower half in FIG. 10.

Each line indicated by (c) in FIG. 10 indicates an operation state of a pixel in units obtained by dividing a block (pixel group) per row. From the top, x1y1r1: the r1-th row of a pixel group of block (x1, y1),
x2y1r1: the r1-th row of a pixel group of block (x2, y1),
x3y1r1: the r1-th row of an image group of block (x3, y1),
x1y1r2: the r2-th row of a pixel group of block (x1, y1),
x2y1r2: the r2-th row of a pixel group of block (x2, y1),
x3y1r2: the r2-th row of a pixel group of block (x3, y1),
x1y2r1: the r1-th row of a pixel group of block (x1, y2),
x1y3r2: the r2-th row of a pixel group of block (x1, y3),
x2y3r2: the r2-row of a pixel group of block (x2, y3), and
x3y3r2: the r2-th row of a pixel group of block (x3, y3) indicate operation states of pixels in units divided per row.

[Solid section] indicates a period in which the READ operation (reading) is performed.

[Broken line section] indicates that an exposure period is ongoing.

As described above with reference to FIG. 5(b), the READ operation of pixels resets charges in the photodiodes PD too, so that, when the READ operation is finished, the period can enter a next exposure period.

For example, (x1y1r1) at the uppermost stage indicated by (c) indicates exposure processing (SHUTTER) and read processing (READ) sequences of the first row (r1) of the block (x1, y1).

The read processing (READ) defined in the first solid line section of (x1y1r1) at the uppermost stage indicated by (c) is executed according to a read start (RDy1) signal (s1) indicated by (b1). Based on this signal (s1), the signal pattern illustrated in FIG. 5(b) is provided to the pixel of the first row (r1) of the block (x1, y1), and signal readout is executed.

When this signal readout is finished, the exposure processing (SHUTTER) is started. The processing starts in the broken line section illustrated in FIG. 10. Next, further, the charge accumulated in an exposure processing unit is read according to the read start (RDy1) signal (s2) indicated by (b1).

As indicated by (c) in FIG. 10, wavy line sections indicated in the exposure period in all rows x1y1r1 to x3y3r2 are the same period. That is, the same exposure period set for a preceding READ operation to a next READ operation is set to all pixels, and all pixels are exposed in the same exposure period (shutter period).

5. EXPOSURE CONTROL OPERATION EXAMPLE 2

Shutter Operation which is Different Per Pixel Group

Next, the exposure control operation example 2 will be described where images can be captured by setting different exposure periods (shutter period) in block (pixel group) units.

Similar to an example of capturing images by means of a normal full and uniform shutter described with reference to FIG. 10, conditions are that the number of pixel groups in the image sensor is 3 (x1 to x3) in the horizontal direction and 3 (y1 to y3) in the vertical direction and each block (pixel group) includes two rows (r1 to r2).

Figure 11:
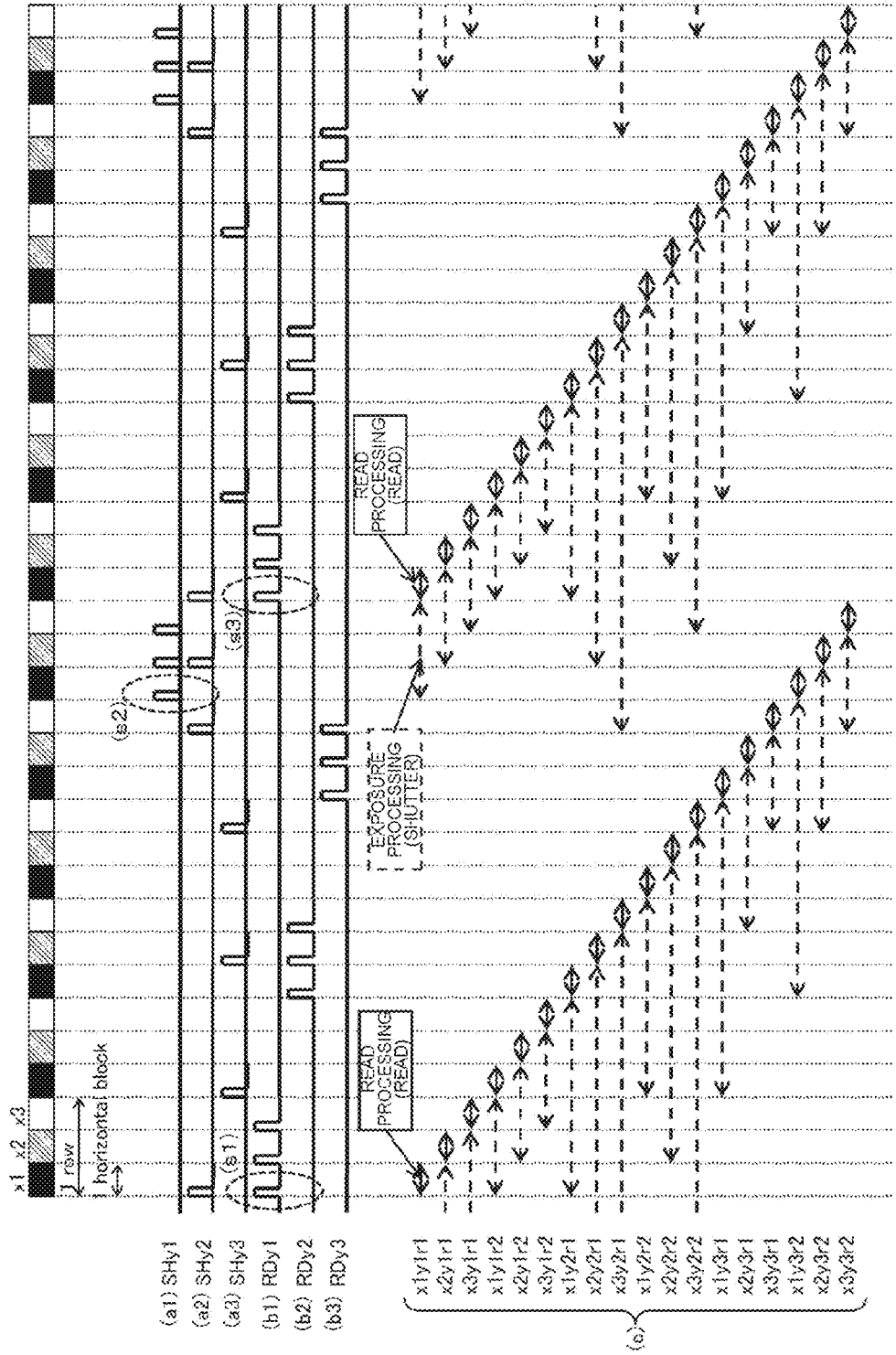
FIG. 11 is a timing chart explaining control of a row group selector when an image is captured by performing normal exposure control (shutter control) of an exposure time which is different per pixel group.

FIG. 11 is a timing chart explaining control of a row group selector when image capturing is performed by performing exposure control of a different exposure time which is different per pixel group.

The horizontal axis indicates the time, and sections indicated by vertical broken lines indicate Q pixel control periods corresponding to a width of one block (one pixel group). That is, a pixel group control period is switched in this section, and areas which are painted in three ways are set at an upper portion in FIG. 11 for ease of understanding of a control period of a corresponding pixel group (one of (x1, x2 and x3).

(1) Black=x1
(2) Diagonal line=x2
(3) White=x3

These correspond to three blocks arranged in the horizontal direction.

In the timing chart illustrated in FIG. 11, three blocks in the horizontal direction and three blocks in the vertical direction in the image sensor, that is, nine blocks of
(x1, y1), (x2, y1), (x3, y1),
(x1, y2), (x2, y2), (x3, y2),
(x1, y3), (x2, y3) and (x3, y3) as block identifiers are control targets.

The conditions are that the number of blocks (pixel groups) in the horizontal direction is three, and one row=all columns is true in three sections. Six lines illustrated in an upper half in FIG. 11 indicate control signals output from the row group selector 123 to each row line selector 124.

From the top line, these signals are
(a1) SHy [SHUTTER (exposure) start control signal] to the y1-th row line selector,
(a2) SHy [SHUTTER (exposure) start control signal] to the y2-th row line selector,
(a3) SHy [SHUTTER (exposure) start control signal] to the y3-th row line selector,
(b1) RDy [READ start control signal] to the y1-th row line selector,
(b2) RDy [READ start control signal] to the y2-th row line selector and
(b3) RDy [READ start control signal] to the y3-th row line selector.

Images are captured by exposure control (shutter control) for an exposure time which is different per block (pixel group)

by adding a sequence of giving the read control signals RDy indicated by (b1) to (b3) at equal intervals to all pixel groups similar to full and uniform shutter control, and, in addition, a sequence of giving the shutter control signals SHy indicated (a1) to (a3) at a timing which is different per pixel group.

The shutter control signals SHy indicated by (a1) to (a3) can be given at some point of time in a period in which the next control signal RDy is given to the same pixel group after the control signal RDy is given, and in synchronization with a control period of this block (pixel group). In an example illustrated in FIG. 11, the number of division of blocks (pixel groups) in the vertical direction is three, one pixel group includes two rows, an interval between the control signal RDy to the next control signal RDy is a six row period, there is one corresponding pixel group control period in one row period, and there are five chances to give the control signals SHy (the number of variations of durations of the exposure period (shutter) is six, and one exposure period overlaps the timing of the control signal RDy and therefore it is not necessary to give the control signal SHy). That is, a shutter time setting includes resolution obtained by dividing one frame period by the number of rows of the image sensor, and, consequently, each pixel group can select in a range of this resolution the shutter time based on the exposure control value to be input.

When the shutter control signal SHy is given to each row line selector, according to the operation described with reference to FIG. 8, this row line selector performs as exposure processing the SHUTTER operation of pixels which this row line selector is in charge of, then the charges accumulated in the pixels are reset and, at this point of time, a new exposure period starts.

(c) in the lower half of FIG. 11 indicates (a) the control signal SHy indicated in the upper half in FIG. 11 and (b) an operation state of each pixel to which RDy is given.

Each line indicated by (c) in FIG. 11 indicates an operation state of a pixel in units obtained by dividing a block (pixel group) per row. From the top, x1y1r1: the r1-th row of a pixel group of block (x1, y1),
x2y1r1: the r1-th row of a pixel group of block (x2, y1),
x3y1r1: the r1-th row of an image group of block (x3, y1),
x1y1r2: the r2-th row of a pixel group of block (x1, y1),
x2y1r2: the r2-th row of a pixel group of block (x2, y1),
x3y1r2: the r2-th row of a pixel group of block (x3, y1),
x1y2r1: the r1-th row of a pixel group of block (x1, y2),
x1y3r2: the r2-th row of a pixel group of block (x1, y3),
x2y3r2: the r2-row of a pixel group of block (x2, y3), and
x3y3r2: the r2-th row of a pixel group of block (x3, y3)
  indicate operation states of pixels in units divided per row.

The solid section indicates a period in which the READ operation (reading) is performed.

The broken line section indicates that an exposure period is ongoing.

Unlike FIG. 10 described as an example of uniform exposure processing, the exposure period is reset according to the control signal SHy, so that images are captured in an exposure period (=broken line section) a duration of which is different per pixel group.

However, according to the operation of the row line selector with respect to the control signal SHy described in FIG. 8, control is performed to provide the same exposure time even for pixels in the same pixel group and in different rows.

For example, (x1y1r1) at the upper most stage indicated by (c) indicates exposure processing (SHUTTER) and read processing (READ) sequences of the first row (r1) of the block (x1, y1).

The read processing (READ) defined in the first solid line section of (x1y1r1) at the uppermost stage indicated by (c) is executed according to a read start (RDy1) signal (s1) indicated by (b1). Based on this signal (s1), the signal pattern illustrated in FIG. 5(b) is provided to the pixel of the first row (r1) of the block (x1, y1), and signal readout is executed.

In the example illustrated in FIG. 11, unlike FIG. 10 described as an example of uniform exposure processing, the exposure period is reset according to the control signal SHy, and the next exposure period starts after this resetting.

Exposure processing of (x1y1r1) at the uppermost stage indicated by (c) is started according to an input signal (s2) of (a1) the control signal SHy. The exposure period of (x1y1r1) at the uppermost stage indicated by (c) is controlled to a period from this (s2) position to a position of a read start (RDy1) signal (s3) indicated by next (b1).

Thus, by setting an exposure (SHUTTER) control signal and a read (READ) control signal in each block unit, it is possible to set a random exposure period in block units.

Figure 12:
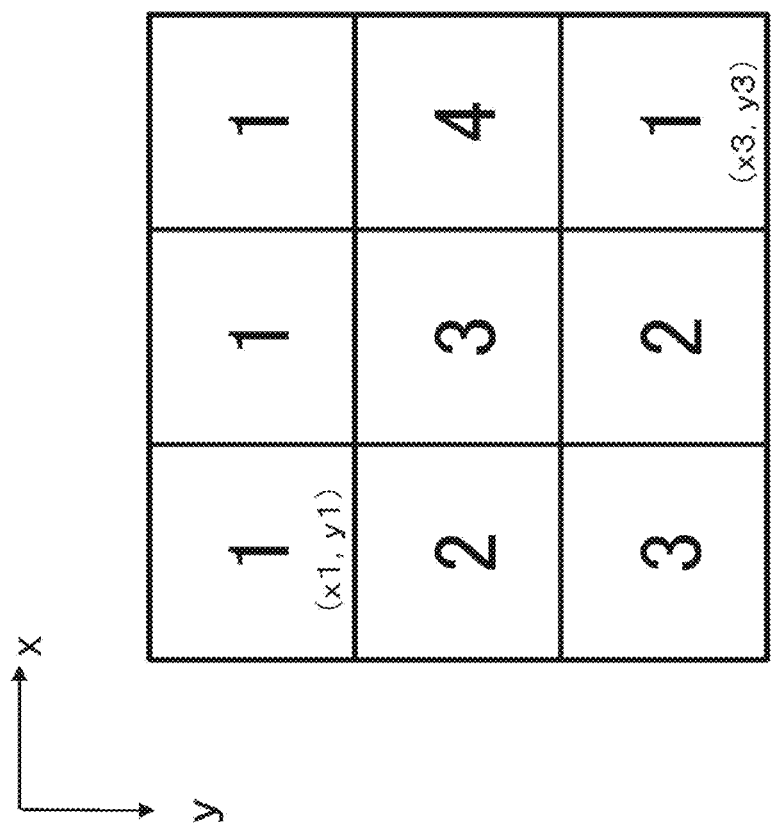
FIG. 12 is a view explaining an example of a shutter time set to an entire imaging area as a result of control illustrated in FIG. 11.

As a result of control illustrated in FIG. 11, the exposure period is controlled to the exposure time (shutter time) as illustrated in FIG. 12 in the entire imaging area. Nine blocks illustrated in FIG. 12 indicate nine blocks (pixel groups) of blocks (x1, y1) to (x3, y3) where the horizontal direction is x, the vertical direction is y, the upper left end block is a block (x1, y1) and a lower right end block is a block (x3, y3).

Numerical values 1 to 4 in blocks indicate relative values of exposure periods (shutter periods). A block to which a numerical value 4 is set indicates that a quadruple exposure period compared to a block to which a numerical value 1 is set is set.

By using the control mechanism according to the present embodiment, signal readout from each pixel is sequentially performed at an equal time interval from an upper left sensor even if shutter control which sets an exposure period which is different per block (pixel group) as illustrated in FIG. 12 is performed, so that it is not necessary to provide an external frame memory or delay line to align image data of one frame. That is, accumulated charge read processing is executed along lines 201a and 201b illustrated in FIG. 11 and is executed in the same way as a conventional read processing sequence, so that a configuration such as a new memory for read processing is not required.

6. SECOND EMBODIMENT

Coexistence with Column ADC

An example has been described above where an image sensor which captures images by performing exposure period control (shutter control) which sets an exposure period which is different per block (pixel group) formed with a plurality of pixels is an image sensor which sequentially reads pixels.

Accumulated charge read processing of each pixel of the image sensor employs a configuration of sequentially reading pixels as described above and, in addition, a column ADC configuration of reading signals from pixels in parallel. The exposure control configuration according to the present invention is also applicable to a read configuration of this column ADC.

Hereinafter, this configuration will be described. In addition, similar to the above described embodiment, the configuration in FIG. 1 is applicable to the entire configuration of the imaging apparatus even in this embodiment.

A configuration and processing of an image sensor 103 are different.

Figure 13:
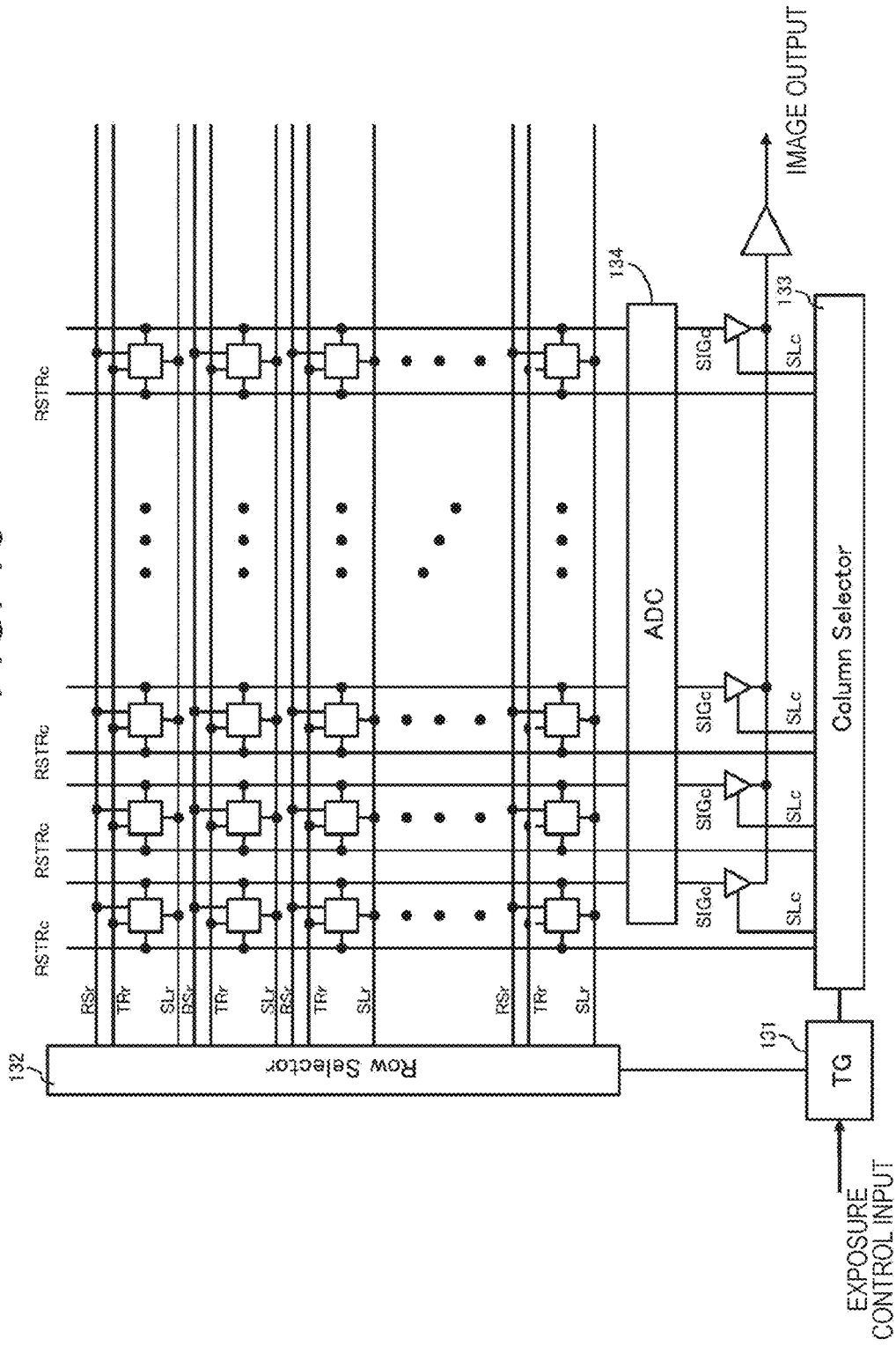
FIG. 13 is a view explaining a configuration of an image sensor using a column ADC.

FIG. 13 is a view explaining a configuration of an image sensor using the column ADC. Each small square in FIG. 13 represents a pixel arranged in a two-dimensional grid pattern on the imaging area. That is, each square represents a pixel having a photoelectric converting element. Each pixel receives inputs of control signals RSr, TRr and SLr through three types of control lines extending in the horizontal direction, and receives an input of a control signal RSTRc through one type of a control signal extending in the vertical direction.

Further, each pixel outputs a pixel signal SIGc through a signal line extending in the vertical direction.

All control lines which transmit three types of control signals (RSr, TRr and SLr) in the horizontal direction are connected to a row selector 132, and the control signals are transmitted to each pixel from the row selector 132.

Further, all control lines in the vertical direction are connected to a column selector 133, and control signals are transmitted to each pixel from the column selector 133.

The row selector 132 and the column selector 133 are connected to a timing generator (TG) 131, and the timing generator (TG) 131 receives for the image sensor 103 an input of the exposure control signal from an outside.

Meanwhile, the exposure control signal input from the outside refers to an exposure control value 116 described with reference to FIG. 2, that is, a block unit exposure control value.

The timing generator (TG) 131 converts the block unit exposure control value into timing information of block unit shutter control, and transmits the timing information to the row selector 132 and the column selector 133. When receiving the timing information, the row selector 132 and the column selector 133 generate control signals per row and per column, and transmit the control signals RSr, TRr, SLr and RSTRc to each pixel.

Unlike the first embodiment, the output pixel signal SIGc output from each pixel is connected to the column ADC 134 which operates in parallel in a plurality of columns, and signals from the pixels are taken in by the column ADC 134. In the present embodiment, the output pixel signal SIGc output from each pixel is read in parallel in block (pixel group) units, and is held in the column ADC 134.

The column ADC 134 performs A-D conversion operation in parallel when signals of one row are obtained, and converts analog pixel signals of one row into digital values.

The digitized pixel signals are sequentially output from the image sensor under control according to the column selection control signal SLc.

In addition, in this second embodiment, the same pixel configuration as the configuration described with reference to FIG. 4 can also be utilized as a configuration of one pixel in the image sensor. Similarly, the same pattern can also be used for signal patterns for executing two pixel operations described with reference to FIG. 5, that is, signal patterns for two processing of (a) charge accumulation processing based on exposure processing "SHUTTER" and (b) accumulated charge output processing based on read processing "READ".

Further, the configurations described above with reference to FIGS. 6 and 7 can also be used for a hierarchical internal configuration of the row selector and the configuration of the row line selector.

However, in the second embodiment in which this column ADC is used, a configuration of a column selector is different from that in the first embodiment described above and therefore will be described below.

In the second embodiment, the column ADC can read pixel signals (accumulated charges) of a plurality of pixels in parallel. Hence, the column selector according to the second embodiment adopts a hierarchical structure as illustrated in FIG. 14, and can simultaneously control a plurality of pixels per pixel group.

Figure 14:
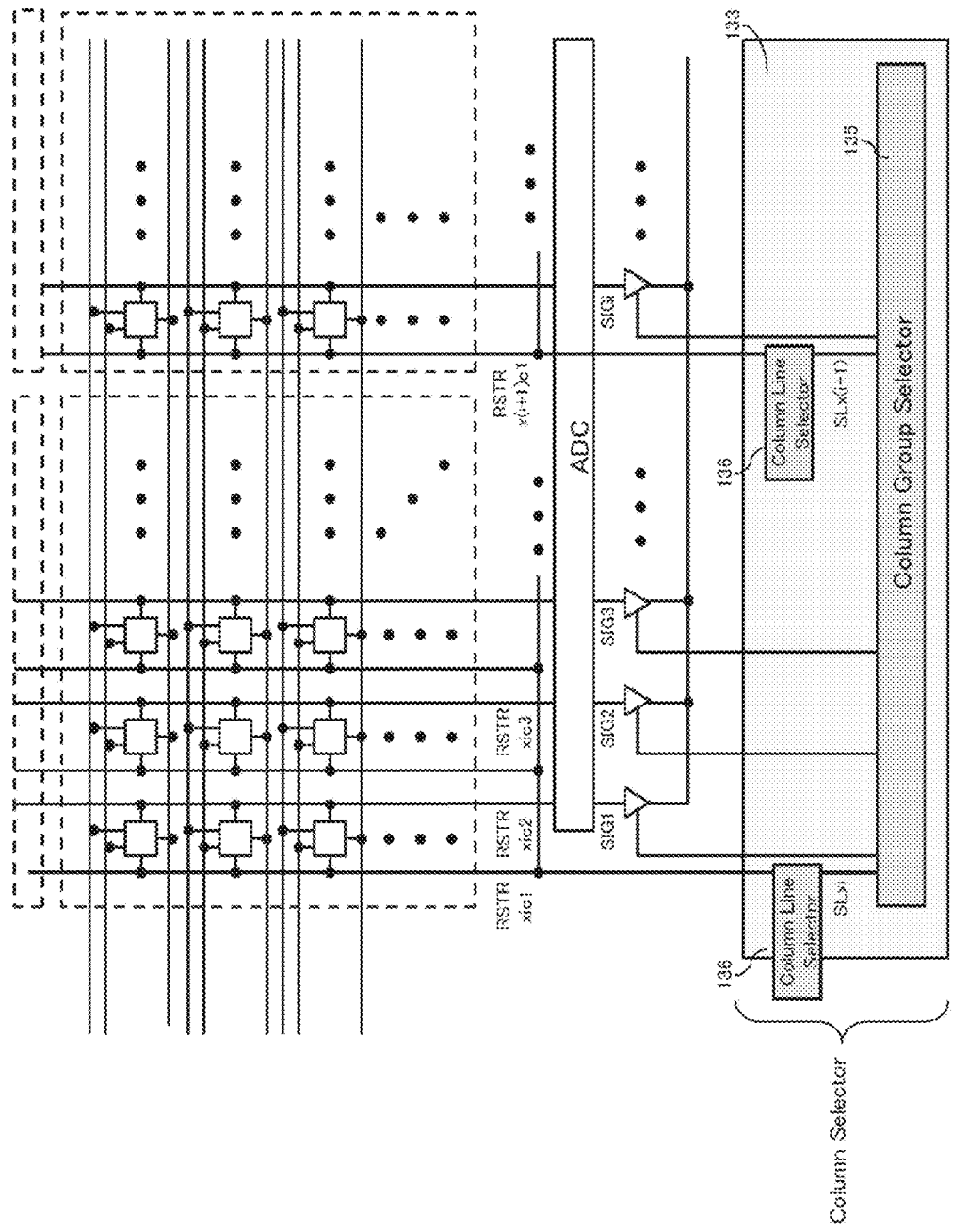
FIG. 14 is a view explaining a configuration example of a column selector according to a second embodiment.

As illustrated in FIG. 14, the internal configuration of the column selector 133 according to the present embodiment adopts a hierarchical structure of a column group selector 135 which generates a block (pixel group) unit control signal, and a plurality of column line selectors 136 which generates control signals in a block (pixel group) in response to the block (pixel group) unit control signal.

The column group selector 135 transmits start of a block (pixel group) unit control period to each column line selector 136 according to a control signal SLx. The column line selector 136 transmits a control signal RSTRc in parallel to all columns of a pixel group which the column line selector 136 is in charge of, in response to the control signal SLx from the column group selector 135.

Meanwhile, the operation of the column line selector 136 is simple, and only includes converting the control signal SLx form the column group selector 135 into the control signal RSTRc to be transmitted to pixels, and transmitting the control signal RSTRc to a plurality of columns in parallel.

Figure 15:
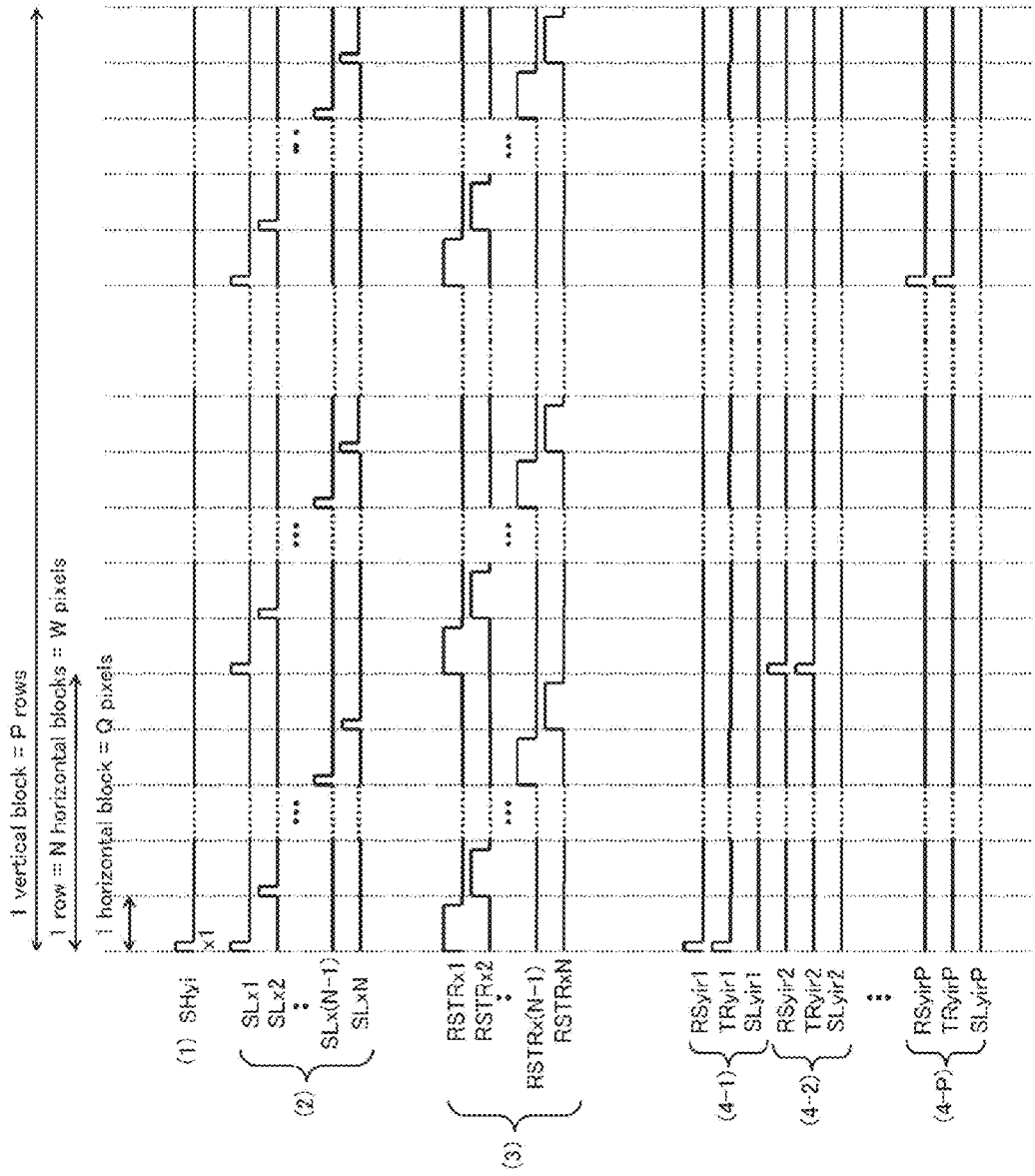
FIG. 15 is a timing chart explaining an operation of the row line selector when the control signal SHy indicating SHUTTER control start which commands exposure processing start is input to one row line selector inside a row selector 132 in FIG. 13.

FIG. 15 is a timing chart explaining an operation of the row line selector when the control signal SHy indicating SHUTTER control start which commands exposure processing start is input to one row line selector inside the row selector 132 in FIG. 13.

In addition, as described above, the configuration of the row selector 132 according to the second embodiment is the same as the configuration of the first embodiment described above, and employs the configuration described with reference to FIGS. 6 and 7.

This FIG. 15 illustrates a processing example upon input of a SHUTTER start control signal (SHy) for the leftmost block (pixel group) (x1) of blocks (x1, yi) to (xN, yi) which are control target blocks (pixel groups) of an i-th row line selector (yi).

In the timing chart illustrated in FIG. 15, the horizontal axis indicates the time, and each line indicates from the top
  (1) the control signal SHy to a yi-th row line selector 124 (see FIGS. 13 and 6),
  (2) control signals SLx (the x1-th, the x2-th, . . . , the x(N−1)-th and the xN-th block (pixel groups) from the top) controlled by the column selector 133 (see FIG. 13),
  (3) control signals RSTRc (the x1-th, the x2-th, . . . , the x(N−1)-th and the xN-th blocks (pixel groups) from the top) controlled by the column selector 133 (see FIG. 13), and
  (4) (4-1) control signals RSr, TRr and SLr to a r1-th row, (4-2) control signals RSr, TRr and SLr to the r2-th row, . . . , and (4-P) control signals RSr, TRr and SLr to a rP-th row which the yi-th row line selector 124 (see FIG. 6) is in charge of.

Meanwhile, N is the number of blocks (pixel groups) in the horizontal direction.

P is the number of rows belonging to (x1, yi).

The column selector 133 repeats an operation of performing sequential scan in block (pixel group) units at all times irrespectively of an exposure control input. The control signal SLx of the column group selector repeats a cycle in which the pixel groups in the horizontal direction, that is, blocks (x1, yi) to (xN, yi) sequentially become active. The control signal RSTRx of the column line selector repeats a cycle in which the pixel groups in the horizontal direction, that is, blocks (x1, yi) to (xN, yi) sequentially become active in synchronization with the control signal SLx.

The period in which RSTRx indicated by (3) in FIG. 15 is a control period of each block (pixel group), and also corresponds to control periods of a plurality of pixels in parallel. When the row group selector outputs SHy, that is, a signal for starting a SHUTTER operation, to an x1yi-th pixel group, x1 is the leftmost pixel group, and the control signal SHy is transmitted to the yi-th row line selector in synchronization with RSTRx1.

The x1-th line selector immediately enters an active state, and the yi-th row line selector which has received the control signal SHy first places the SHUTTER control signal generator (see FIG. 7) in an active state to start generating a SHUTTER control signal.

At a timing to transmit a control signal to each pixel, each row selection switch 130 illustrated in FIG. 7 is controlled such that the SHUTTER control signal is transmitted to each row: r1 row to rP row of the control target block.

As a result, as indicated by (4-1) in FIG. 15, SHUTTER control signals (signals RSyir1 and TRyir1) to the r1-th row (for example, the r1 row illustrated in FIG. 6) is transmitted once in synchronization with RSTRx1.

Subsequently, there is no column in periods of RSTRx2 to RSTRxN, and therefore a control signal is not generated. That is, a processing period matching the upper left end block (x1, yi) illustrated in FIG. 6 has not come, and therefore control signals [=SHUTTER control signals (signals RSyir1 and TRyir1)] to the r1-th row indicated by (4-1) in FIG. 15 are not generated.

Next, as indicated by (4-2) in FIG. 15, SHUTTER control signals (signals RSyir2 and TRyir2) to the r2-th row (for example, the r2 row illustrated in FIG. 6) is transmitted once in synchronization with RSTRx1.

Subsequently, there is no column in periods of RSTRc2 to RSTRxN, and therefore a control signal is stopped.

Subsequently, as indicated by (4-1) to (4-P) in FIG. 15, the same operation is repeated until rP. That is, the same processing is performed for a P-th row (rP row) of the upper left block (x1, yi) illustrated in FIG. 6. By this means, the SHUTTER operation is completed for all pixels in a control target block (pixel group) which is, for example, the upper left block (x1, yi) illustrated in FIG. 6, so that an operation with respect to an input of the control signal SHy is completed. In addition, to realize this series of timing control, a row line selector only needs to have a simple pattern generating circuit formed by, for example, a counter.

Next, an operation of the row line selector when the control signal RDy indicating READ control start which commands read processing start is input to one row line selector inside a row selector 132 in FIG. 13 will be described with reference to a timing chart illustrated in FIG. 16.

In addition, as described above, the configuration of the row selector 132 according to the second embodiment is the same as the configuration of the first embodiment described above, and employs the configuration described with reference to FIGS. 6 and 7.

Similar to FIG. 15 described above, this FIG. 16 also illustrates a processing example upon input of a READ start control signal (RDy) for the leftmost block (pixel group) (x1) of blocks (x1, yi) to (xN, yi) which are control target blocks (pixel groups) of an i-th row line selector (yi)

Figure 16:
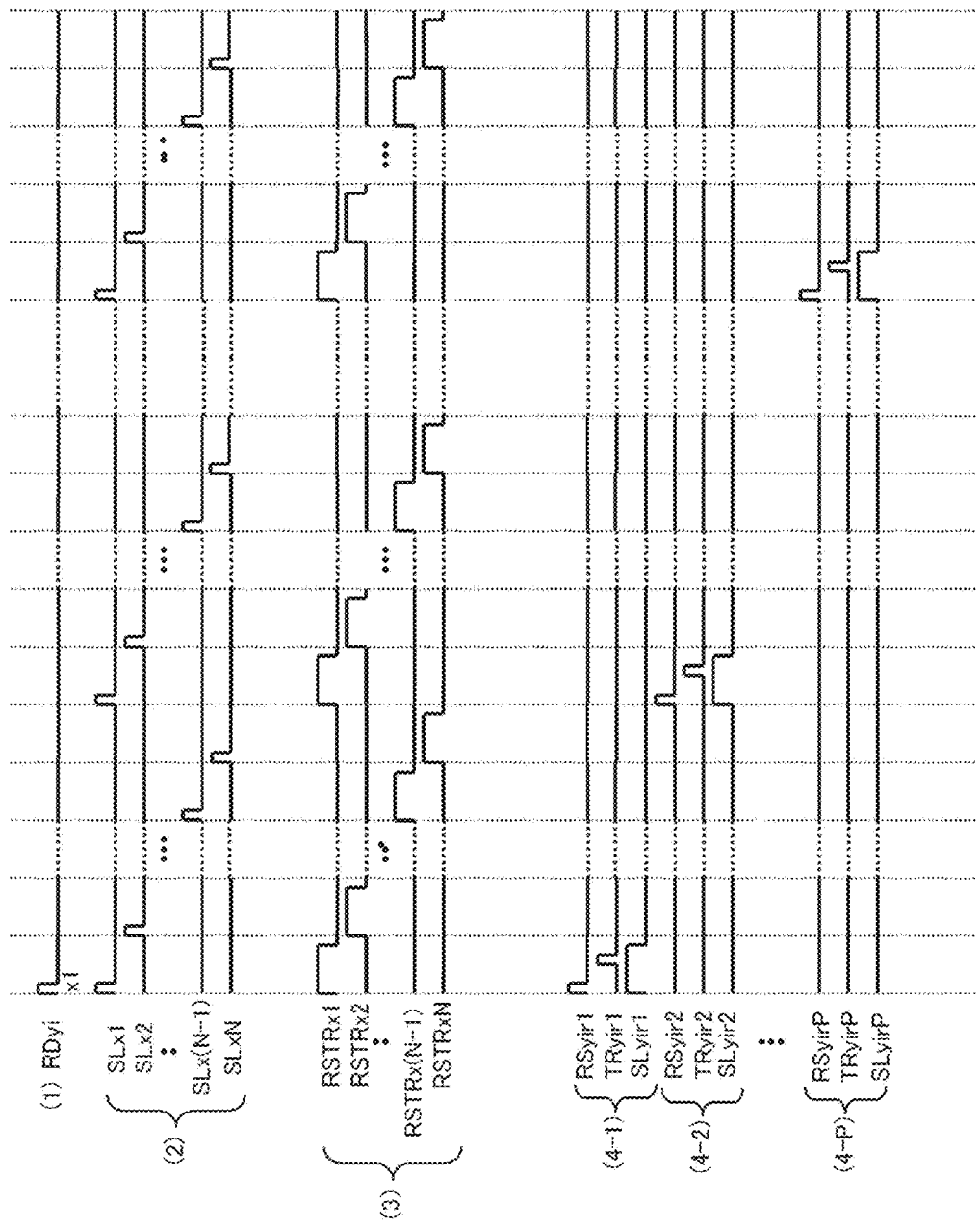
FIG. 16 is a timing chart explaining an operation of the row line selector when the control signal RDy indicating READ control start which commands read processing start is input to one row line selector inside a row selector 132 in FIG. 13.

In the timing chart illustrated in FIG. 16, the horizontal axis indicates the time, and each line indicates from the top
(1) the control signal RDy to a yi-th row line selector 124 (see FIGS. 13 and 6),
(2) control signals SLx (the x1-th, the x2-th, . . . , the x(N–1)-th and the xN-th block (pixel groups) from the top) controlled by the column selector 133 (see FIG. 13),
(3) control signals RSTRc (the x1-th, the x2-th, . . . , the x(N–1)-th and the xN-th blocks (pixel groups) from the top) controlled by the column selector 133 (see FIG. 13), and
(4) (4-1) control signals RSr, TRr and SLr to a r1-th row, (4-2) control signals RSr, TRr and SLr to the r2-th row, . . . , and (4-P) control signals RSr, TRr and SLr to a rP-th row of which the yi-th row line selector 124 (see FIG. 6) is charge of.

Meanwhile, N is the number of blocks (pixel groups) in the horizontal direction.

P is the number of rows belonging to (x1, yi).

The column selector 133 repeats an operation of performing sequential scan in block (pixel group) units of the image sensor at all times irrespectively of an exposure control input. The control signal SLx of the column group selector repeats a cycle in which the pixel groups in the horizontal direction, that is, blocks (x1, yi) to (xN, yi) sequentially become active. The control signal RSTRx of the column line selector repeats a cycle in which the pixel groups in the horizontal direction, that is, blocks (x1, yi) to (xN, yi) sequentially become active in synchronization with the control signal SLx.

The period in which RSTRx indicated by (3) in FIG. 16 is a control period of each block (pixel group), and also corresponds to control periods of a plurality of pixels in parallel. When the row group selector outputs RDy, that is, a signal for starting a READ operation, to a x1yi-th pixel group, x1 is the leftmost pixel group, and the control signal RDy is transmitted to the yi-th row line selector in synchronization with RSTRx1.

The x1-th line selector immediately enters an active state, and the yi-th row line selector which has received the control signal SHy first places the SHUTTER control signal generator (see FIG. 7) in an active state to start generating a READ control signal.

Further, each row selection switch 130 illustrated in FIG. 7 is controlled such that the READ control signal is transmitted to each row: r1 row to rP row of the control target block.

As a result, as indicated by (4-1) in FIG. 16, READ control signals (signals RSyir1, TRyir1 and SLyir1) for the r1-th row (for example, the r1-th row illustrated in FIG. 6) is transmitted once in synchronization with RSTRx1.

Subsequently, there is no column in periods of RSTRx2 to RSTRxN, and therefore a control signal is not generated.

Next, as indicated by (4-2) in FIG. 16, READ control signals (signals RSyir2, TRyir2 and SLyir2) for the r2-th row (for example, the r2 row illustrated in FIG. 6) is transmitted once in synchronization with RSTRx1. Subsequently, there is no column in periods of RSTRc2 to RSTRxN, and therefore a control signal is stopped.

Subsequently, as indicated by (4-1) to (4-P) in FIG. 16, the same operation is repeated until rP. That is, the same processing is performed for a P-th row (rP row) of the upper left block (x1, yi) illustrated in FIG. 6. By this means, the READ operation is completed for all pixels in a control target block (pixel group) which is, for example, the upper left block (x1, yi) illustrated in FIG. 6, so that an operation with respect to an input of the control signal RDy is completed. In addition, to realize this series of timing control, a row line selector only needs to have a simple pattern generating circuit formed by, for example, a counter.

By using the configuration according to the second embodiment described above, the present invention can also coexist with the column ADC. In addition, an exposure control operation of the entire image sensor is the same as the operations in FIGS. 10 and 11 described according to the first embodiment, and therefore will not be described.

7. THIRD EMBODIMENT

Setting Configuration of Pixel Group and Overlap Configuration of Pixel Group Positions Examples have been described with the above embodiments where rectangular blocks (pixel groups) are set to multiple pixels included in an image sensor, and an exposure period is controlled in rectangular block (pixel group) units.

However, the exposure period does not necessarily need to be controlled in such rectangular block units. By, for example, intentionally shifting a control timing of calculation of the row line selector and changing an interval, it is possible to form stripe-shaped pixel groups at one to several pixel intervals in the horizontal direction or the vertical direction, form parallelogram pixel groups which are diagonally dented instead of rectangles and set an exposure period in units of pixel groups having various shapes.

Further, although one pixel cannot belong to a plurality of pixel groups and variously controlled, it is also possible to form a plurality of pixel groups such that the pixel groups overlap each other on the imaging area by utilizing pixel group shapes with stripe shapes with intervals. This simple example will be specifically described with reference to FIG. 17.

Figure 17:
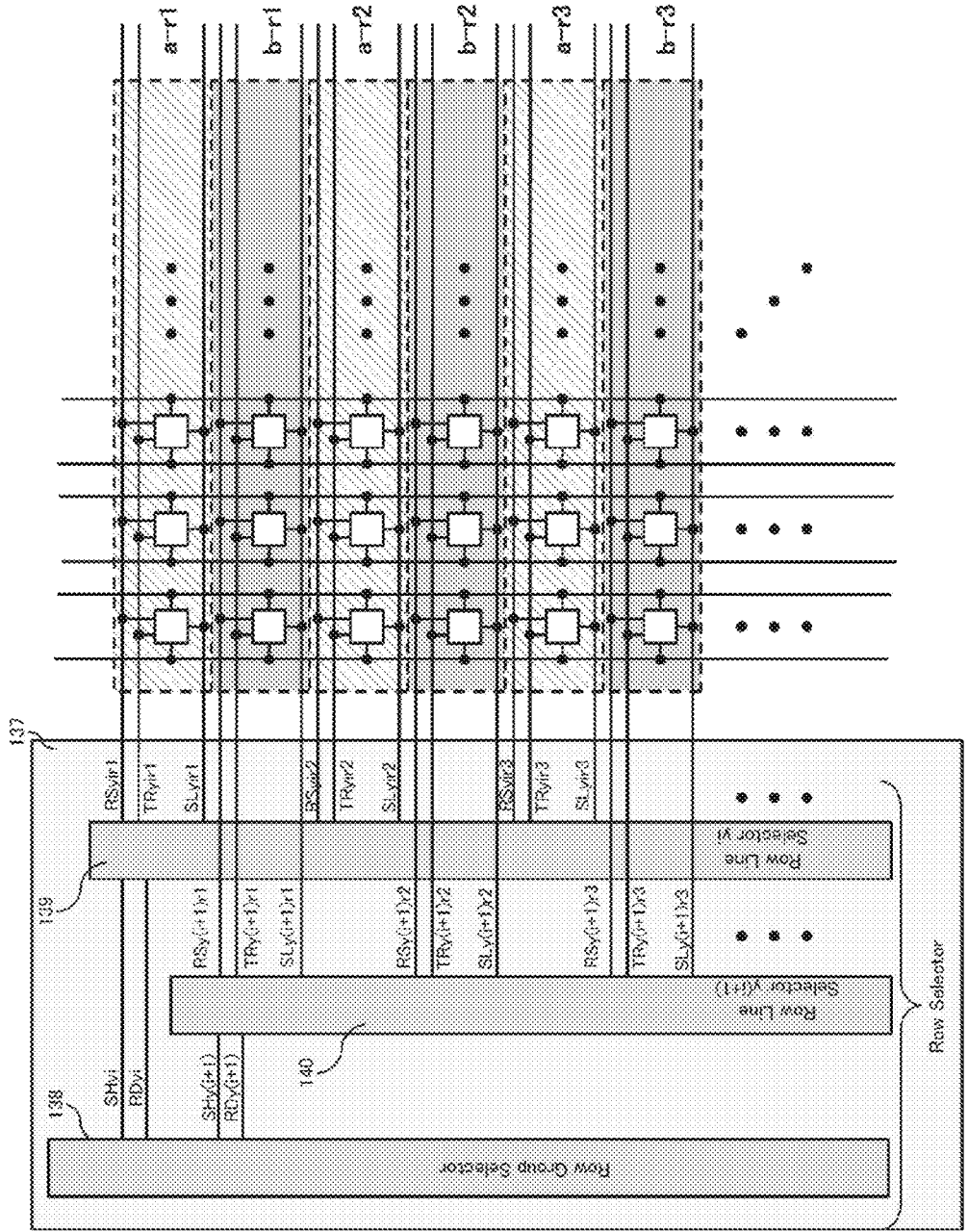
FIG. 17 is a view explaining a hierarchical structure of the row selectors which form pixel groups areas of which overlap each other.

FIG. 17 is a view explaining a hierarchical structure of the row selector which forms blocks (pixel groups) areas of which overlap each other. The row selector 137 is the same as the row selector according to the first and second embodiments described above with reference to FIG. 6 in a hierarchical structure of the row group selector 138 which outputs pixel group unit control signals and a plurality of row line selectors 139 and 140 which is associated with each pixel group and distributes control signals to each row based on control signal from the row group selector 138.

Characteristics of the image sensor illustrated in FIG. 17 include that one row line selector controls every other rows.

For example, a row line selector 139 extends a control line to each pixel of pixel areas (a-r1), (a-r2), (a-r3) and . . . of every other rows, and control these pixels.

For example, a row line selector 140 extends a control line to each pixel of pixel areas (b-r1), (b-r2), (b-r3) and . . . of every other rows, and control these pixels.

Pixels which the row line selectors are in charge of are alternately arranged, so that it is possible to perform two types of exposure control of the area by means of a shutter the row line selector 139 and a shutter of the row line selector 140 in a macro view.

That a plurality of shutters can be used for one area means that effective exposure control of an image in which there are a bright subject and a dark subject in an identical area is realized.

According to the very same method, it is also possible to divide a column and make pixel groups overlap each other.

Figure 18:
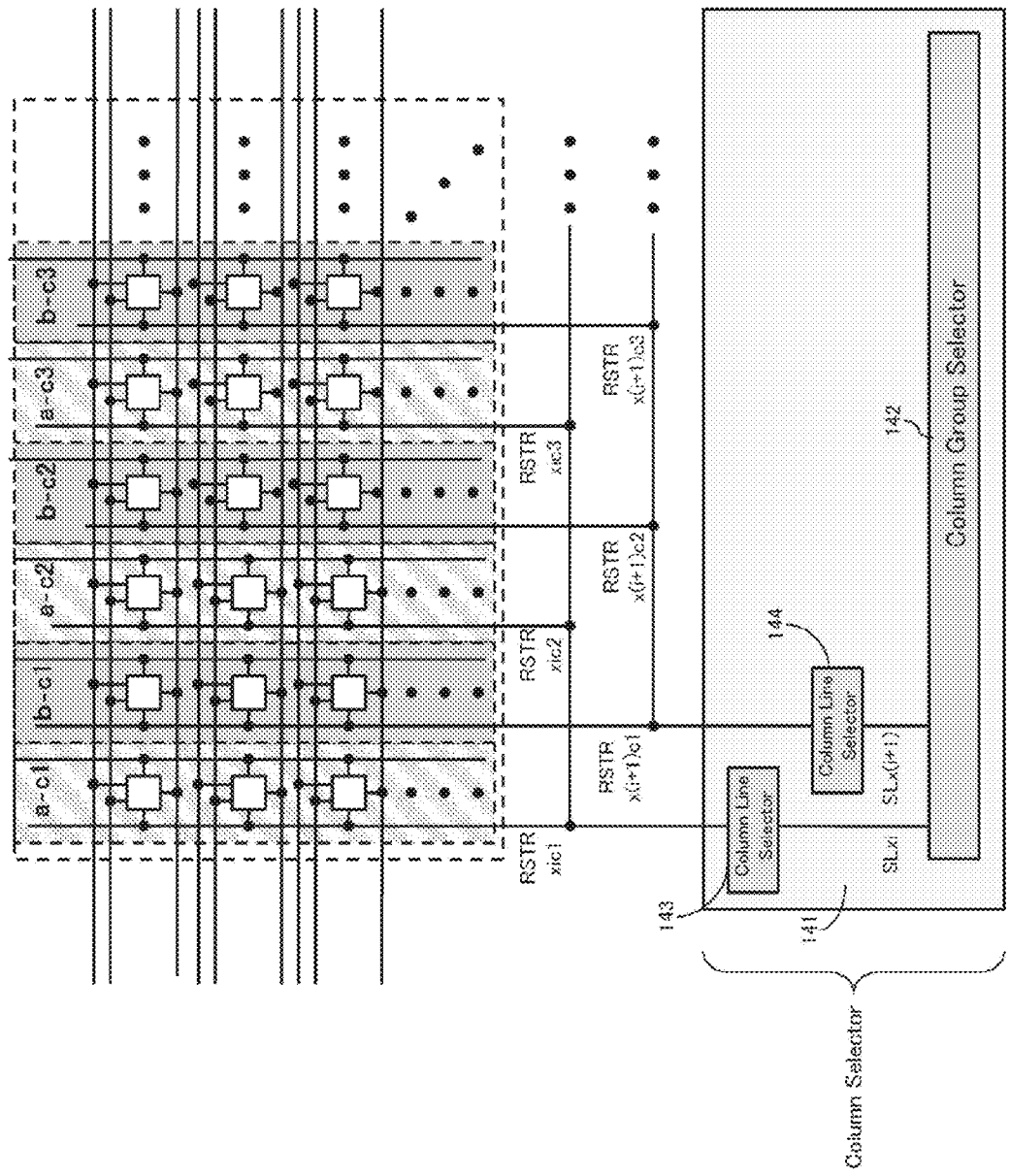
FIG. 18 is a view explaining a hierarchical structure of the row selectors which form pixel groups areas of which overlap each other.

In this case, as illustrated in FIG. 18, a structure of the column selector 141 is changed, and a column group selector 142 and a plurality of column line selectors are provided. For example, the column line selector 143 and the column line selectors 144 in FIG. 18 control every other column, and alternately control columns.

For example, the column line selector 143 extends a control line to each pixel of pixel areas (a-c1), (a-c2), (a-c3) and . . . of every other column, and control these pixels.

Further, the column line selector 144 extends a control line to each pixel of pixel areas (b-c1), (b-c2), (b-c3) and . . . of every other columns, and control these pixels.

Such setting is also possible.

8. CONCLUSION OF CONFIGURATION AND EFFECT ACCORDING TO PRESENT INVENTION

As described in the above plurality of embodiments, the imaging apparatus according to the present invention performs exposure control which sets an exposure period per block (pixel group) formed with a plurality of pixels at close positions from each other on the imaging area instead of per pixel. According to this configuration, without making a control circuit inside the image sensor excessively larger, it is possible to realize adaptive exposure control per area.

Further, by providing an input I/F which receives exposure control values the number of which corresponds to the number of pixel groups, it is also possible to contain a band of an exposure control value input to a low band and calculate the exposure control values by a low computation amount. Furthermore, a mechanism which converts the exposure control values into pixel control signals adopts a hierarchical structure, and employs a configuration in which a means which generates control signals for pixel groups and a means which generates control signals for pixels in the pixel groups are separated. While the control signals to the pixel groups depend on scenes, have significantly changing conditions in the control signal time sequences and have a small data amount in a low band, although the control signals in the pixel groups have a high data amount in a high band, the time sequences of the control signals can be generated in a standard form. By hierarchically dividing a generating means of a control signal, mounting becomes easy.

Further, the present invention realizes a control mechanism which makes an exposure time for pixels belonging to an identical pixel group uniform between a plurality of rows. Furthermore, for pixel signal readout, a control mechanism which sequentially reads rows similar to conventional rolling shutter control is realized. Even when a control mechanism of a conventional technique which controls each pixel is applied to pixel groups, all pixels in pixel groups operate in synchronization, and therefore the rate of signal readout becomes uneven, and there is a problem that data cannot be output to subsequent pipeline processing by providing a data buffer outside a sensor and performing rearranging processing. The control mechanism according to the present invention constantly reads pixel signals at all times, and does not need to rearrange data.

Further, the present invention realizes, for example, a mechanism which freely controls exposure of, for example, rectangular blocks (pixel groups). This mechanism can be extended to an area which is a set of a plurality of rectangles, and allows areas to substantially overlap. By this means, it is possible to capture images of one area for a plurality of exposure times, and realize a highly practical exposure control mechanism which can support every scene.

The present invention has been described in detail with reference to specific embodiments. However, it is obvious that one of ordinary skill in art can modify or substitute embodiments within a scope which does not deviate from the spirit of the present invention. That is, the present invention has been disclosed in modes of illustration, and should not be interpreted in a limited manner. The claims should be taken into account to decide the spirit of the present invention.

Further, a series of processing described in this description can be executed by hardware, software or a complex configuration of both. When processing is executed by software, a program which records a processing sequence can be executed by being installed in a memory in a computer in which dedicated hardware is implemented, or a program can be executed by being installed in a general-purpose computer which can execute various processing. For example, a program can be recorded in advance in a recording medium. It is possible to install the program in a computer from a recording medium, and, in addition, receive the program through a network such as Internet and install the program in a recording medium such as a built-in hard disk.

In addition, various processing described in the description may be not only executed in time sequences according to the description or executed in parallel or individually depending on processing performance of an apparatus which executes processing or if necessary. Further, the system in this description refers to a logical set configuration of a plurality of apparatuses, and is not limited to a system in which each constituent apparatus is provided in a single housing.

INDUSTRIAL APPLICABILITY

As described above, according to a configuration of one embodiment of the present invention, a configuration is realized which executes different exposure control in pixel group units obtained by dividing a plurality of pixels of an imaging area of an image sensor.

Brightness evaluation is executed in pixel group units formed with a plurality of pixels, and a pixel group unit exposure control value is calculated according to an evaluation result. The image sensor outputs a control signal matching the calculated pixel group unit exposure control value to each pixel group constituent pixel, and controls exposure in the pixel group units. For example, the exposure control signal including an identical pattern is sequentially output to a plurality of pixels in a pixel group in a time sequence, and exposure control which sets an identical exposure time for a plurality of pixels belonging to one pixel group is realized.

REFERENCE SIGNS LIST

101 Lens
102 Diaphragm
103 Image sensor
104 DSP block
105 LCD driver
106 LCD
107 CODEC
108 Memory
109 CPU
110 Input device
111 Exposure compensation multiplier
112 Signal processing unit
113 Block brightness evaluation value
115 Exposure control value calculating unit
118 Timing generator (TG)
119 Row selector
120 Column selector
121 CDS
122 ADC
123 Row group selector
124 Row line selector
125 to 127 Line selector
128 Shutter control signal generator
129 READ control signal generator
130 Row selection switch
131 Timing generator (TG)
132 Row selector
133 Column selector
134 ADC
135 Column group selector
136 Column line selector
137 Row selector
138 Row group selector
139 Row line selector
140 Row line selector
141 Column selector
142 Column group selector
143 Column line selector
144 Column line selector

The invention claimed is:

1. An imaging apparatus comprising:
a brightness evaluating unit which evaluates brightness in a pixel group unit formed with a plurality of pixels;
an exposure control value calculating unit which calculates an exposure control value in the pixel group unit according to an evaluation result of the brightness evaluating unit; and
an image sensor which outputs a control signal matching the exposure control value in the pixel group unit calculated by the exposure control value calculating unit, to each pixel group constituent pixel, and controls exposure in the pixel group unit;
wherein the image sensor comprises a hierarchical structure of:
a plurality of row line selectors which outputs exposure control signals for a pixel group set in a row direction; and
a row group selector which outputs a control signal which designates a control signal output timing for the plurality of row line selectors.

2. The imaging apparatus according to claim 1, wherein the image sensor
performs processing of sequentially outputting as the control signal the exposure control signal comprising an identical pattern to the plurality of pixels in the pixel group, and performs exposure control which sets an identical exposure time for the plurality of pixels belonging to one pixel group.

3. The imaging apparatus according to claim 1, wherein the image sensor
combines as the control signal a control signal in a row unit and a control signal in a column unit, and executes control processing of specifying a control target pixel.

4. The imaging apparatus according to claim 1, wherein the image sensor
sets in the pixel group unit an exposure start control signal which indicates a start timing of exposure processing and a read start control signal which indicates a start timing of read processing, and controls the exposure in the pixel group unit.

5. The imaging apparatus according to claim 1, wherein the row line selector outputs a control signal in a control target pixel group unit according to the control signal which designates the control signal output timing from the row group selector.

6. The imaging apparatus according to claim 1, wherein the row line selector comprises:
a shutter control signal generating unit which outputs an exposure pattern signal for executing exposure processing of each pixel; and
a read control signal generating unit which outputs a read pattern signal for executing read processing of each pixel, and
according to a type of the control signal which designates the control signal output timing from the row group selector, the row line selector executes processing of selectively outputting the control signal generated by the shutter control signal generating unit or the read control signal generating unit.

7. The imaging apparatus according to claim 1, wherein the image sensor comprises:
- a column ADC which AD-converts pixel signals in a row of the image sensor in parallel; and
- a column selector which comprises a hierarchical structure of: a column group selector which generates a control signal in the pixel group unit; and
- a plurality of column line selectors which generates control signals in a pixel group in response to the control signal in the pixel group unit.

8. The imaging apparatus according to claim 1, wherein the pixel group is a pixel group comprising a set of adjacent pixels.

9. The imaging apparatus according to claim 1, wherein the pixel group is a pixel group comprising a set of pixels in a plurality of separate areas.

10. An image sensor which outputs a control signal matching an exposure control signal set in a pixel group unit obtained by dividing a plurality of pixels on an imaging area to each pixel group constituent pixel, and controls exposure in the pixel group unit;
wherein the image sensor comprises a hierarchical structure of:
- a plurality of row line selectors which outputs exposure control signals for a pixel group set in a row direction; and
- a row group selector which outputs a control signal which designates a control signal output timing for the plurality of row line selectors.

11. The image sensor according to claim 10, wherein the image sensor performs processing of sequentially outputting as the control signal the exposure control signal comprising an identical pattern to the plurality of pixels in the pixel group, and performs exposure control which sets an identical exposure time for the plurality of pixels belonging to one pixel group.

12. The image sensor according to claim 10, wherein the image sensor combines as the control signal a control signal in a row unit and a control signal in a column unit, and executes control processing of specifying a control target pixel.

13. The image sensor according to claim 10, wherein the image sensor sets in the pixel group unit an exposure start control signal which indicates a start timing of exposure processing and a read start control signal which indicates a start timing of read processing, and controls the exposure in the pixel group unit.

14. An imaging control method executed in an imaging apparatus comprising:
- a brightness evaluating step of, at a brightness evaluating unit, evaluating brightness in a pixel group unit formed with a plurality of pixels;
- an exposure control value calculating step of, at an exposure control value calculating unit, calculating an exposure control value in the pixel group unit according to an evaluation result in the brightness evaluating step; and
- an image capturing step of, at an image sensor, outputting a control signal matching the exposure control value in the pixel group unit calculated in the exposure control value calculating step, to each pixel group constituent pixel, and controlling exposure in the pixel group unit;
wherein the image sensor comprises a hierarchical structure of:
- a plurality of row line selectors which outputs exposure control signals for a pixel group set in a row direction; and
- a row group selector which outputs a control signal which designates a control signal output timing for the plurality of row line selectors.

15. A computer readable medium on which is stored a program which, when implemented, causes an imaging apparatus to execute image capturing control processing, causing the imaging apparatus to execute:
- a brightness evaluating step of causing a brightness evaluating unit to evaluate brightness in a pixel group unit formed with a plurality of pixels;
- an exposure control value calculating step of causing an exposure control value calculating unit to calculate an exposure control value in the pixel group unit according to an evaluation result in the brightness evaluating step; and
- an image capturing step of causing an image sensor to output a control signal matching the exposure control value in the pixel group unit calculated in the exposure control value calculating step, to each pixel group constituent pixel, and controlling exposure in the pixel group unit;
wherein the image sensor comprises a hierarchical structure of:
- a plurality of row line selectors which outputs exposure control signals for a pixel group set in a row direction; and
- a row group selector which outputs a control signal which designates a control signal output timing for the plurality of row line selectors.

* * * * *